US010831338B2

(12) United States Patent
Zhang et al.

(10) Patent No.: US 10,831,338 B2
(45) Date of Patent: Nov. 10, 2020

(54) HIDING REGIONS OF A SHARED DOCUMENT DISPLAYED ON A SCREEN

(71) Applicant: Huawei Technologies Co., Ltd., Shenzhen (CN)

(72) Inventors: Tingting Zhang, Shenzhen (CN); Fei Yang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 897 days.

(21) Appl. No.: 15/151,056

(22) Filed: May 10, 2016

(65) Prior Publication Data

US 2016/0253055 A1     Sep. 1, 2016

Related U.S. Application Data

(63) Continuation of application No. PCT/CN2014/075077, filed on Apr. 10, 2014.

(30) Foreign Application Priority Data

Nov. 26, 2013    (CN) .......................... 2013 1 0611629

(51) Int. Cl.
*G06F 9/48*          (2006.01)
*G06F 3/0482*        (2013.01)
(Continued)

(52) U.S. Cl.
CPC ........ *G06F 3/0482* (2013.01); *G06F 3/04842* (2013.01); *G06F 3/04845* (2013.01);
(Continued)

(58) Field of Classification Search
CPC ............... G06F 3/0482; G06F 3/04845; G06F 3/04842; G06F 3/04883; G06F 3/04886;
(Continued)

(56) References Cited

U.S. PATENT DOCUMENTS 6,628,310 B1 *   9/2003   Hiura .................... G06F 3/0481
                                               715/776
7,779,475 B2 *   8/2010   Jakobson ................ G06F 21/62
                                                  726/26
(Continued)

FOREIGN PATENT DOCUMENTS

CN           101308445 A      11/2008
CN           101404687 A       4/2009
(Continued)

OTHER PUBLICATIONS

Machine Translation and Abstract of Chinese Publication No. CN101308445, Nov. 19, 2008, 7 pages.
(Continued)

*Primary Examiner* — Jennifer N To
*Assistant Examiner* — K C Chen
(74) *Attorney, Agent, or Firm* — Conley Rose, P.C.

(57) ABSTRACT

A document presentation method and a user terminal are provided. The method includes selecting, by a user terminal from a plurality of documents on a screen according to a first click position of a user, a to-be-presented document that presents content, where all the documents on the screen are shielded and invisible to the user, identifying a selected input of the user, and adjusting a visible proportion of a shielded region of the to-be-presented document according to the identified selected input. In this way, the user terminal presents solely a document that needs to be shared when the user and a person with whom documents are shared watch a same computer screen together. The user terminal can correspondingly present a partial region of the to-be-presented document according to the selected input of the user, thereby avoiding excessive exposure of information when a shared document is browsed.

17 Claims, 14 Drawing Sheets

(51) Int. Cl.
*G06F 3/0488* (2013.01)
*G06F 21/62* (2013.01)
*G06F 40/106* (2020.01)
*G06F 3/0484* (2013.01)

(52) U.S. Cl.
CPC ...... *G06F 3/04883* (2013.01); *G06F 3/04886* (2013.01); *G06F 21/6227* (2013.01); *G06F 40/106* (2020.01); *G06F 2203/04804* (2013.01); *G06F 2203/04806* (2013.01); *G06F 2221/032* (2013.01)

(58) Field of Classification Search
CPC ............... G06F 21/6227; G06F 17/212; G06F 2221/032; G06F 2203/04804; G06F 2203/04806; G06F 40/106
See application file for complete search history.

(56) References Cited

U.S. PATENT DOCUMENTS

| | | | | |
|---|---|---|---|---|
| 9,161,021 | B2* | 10/2015 | Kim | G06F 3/04883 |
| 2005/0204305 | A1* | 9/2005 | Keely, Jr. | G06F 3/0483 |
| | | | | 715/781 |
| 2007/0006316 | A1 | 1/2007 | Veselova et al. | |
| 2007/0226642 | A1* | 9/2007 | Soulier | G06F 3/0486 |
| | | | | 715/768 |
| 2009/0094562 | A1 | 4/2009 | Jeong et al. | |
| 2010/0131868 | A1* | 5/2010 | Chawla | G06F 3/044 |
| | | | | 715/759 |
| 2010/0190531 | A1 | 7/2010 | Hasegawa | |
| 2011/0175930 | A1* | 7/2011 | Hwang | G06F 3/0481 |
| | | | | 345/629 |
| 2012/0036452 | A1* | 2/2012 | Coleman | G06F 21/55 |
| | | | | 715/751 |
| 2012/0075347 | A1 | 3/2012 | Jang et al. | |
| 2012/0098639 | A1 | 4/2012 | Ijas | |
| 2012/0124389 | A1 | 5/2012 | Villani et al. | |
| 2012/0218206 | A1* | 8/2012 | Sato | G06F 3/041 |
| | | | | 345/173 |
| 2013/0080471 | A1* | 3/2013 | Forte | G06Q 10/00 |
| | | | | 707/785 |
| 2013/0246957 | A1 | 9/2013 | Kudo | |
| 2014/0104210 | A1* | 4/2014 | Kim | G06F 3/0488 |
| | | | | 345/173 |
| 2015/0100908 | A1* | 4/2015 | Magistrado | G06F 3/0484 |
| | | | | 715/766 |
| 2016/0307002 | A1* | 10/2016 | Zha | G06F 21/62 |

FOREIGN PATENT DOCUMENTS

| | | |
|---|---|---|
| CN | 101640725 A | 2/2010 |
| CN | 102999599 A | 3/2013 |
| CN | 103135903 A | 6/2013 |
| CN | 103324407 A | 9/2013 |
| EP | 2045700 A1 | 4/2009 |
| JP | H06348808 A | 12/1994 |
| JP | 2002055750 A | 2/2002 |
| JP | 20090201063 A | 9/2009 |
| JP | 2010049475 A | 3/2010 |
| KR | 20130058177 A | 6/2013 |

OTHER PUBLICATIONS

Machine Translation and Abstract of Chinese Publication No. CN102999599, Mar. 27, 2013, 14 pages.
Machine Translation and Abstract of Japanese Publication No. JP2010049475, Mar. 4, 2010, 48 pages.
Machine Translation and Abstract of Korean Publication No. KR20130058177, Jun. 4, 2013, 31 pages.
Foreign Communication From a Counterpart Application, Chinese Application No. 201310611629.5, Chinese Office Action dated May 2, 2017, 7 pages.
Foreign Communication From a Counterpart Application, Korean Application No. 20167014045, Korean Office Action dated May 22, 2017, 5 pages.
Foreign Communication From a Counterpart Application, Korean Application No. 20167014045, English Translation of Korean Office Action dated May 22, 2017, 3 pages.
Partial English Translation and Abstract of Chinese Patent Application No. CN101404687, May 5, 2016, 6 pages.
Foreign Communication From a Counterpart Application, European Application No. 14865016.1, Extended European Search Report dated Sep. 23, 2016, 9 pages.
Foreign Communication From a Counterpart Application, PCT Application No. PCT/CN2014/075077, English Translation of International Search Report dated Sep. 2, 2014, 2 pages.
Foreign Communication From a Counterpart Application, PCT Application No. PCT/CN2014/075077, English Translation of Written Opinion dated Sep. 2, 2014, 6 pages.
Partial English Translation and Abstract of Japanese Patent Application No. JPA200255750, Feb. 20, 2002, 32 pages.
Partial English Translation and Abstract of Japanese Patent Application No. JPA2009201063, Sep. 3, 2009, 17 pages.
Partial English Translation and Abstract of Japanese Patent Application No. JPH06348808, Dec. 22, 1994, 32 pages.
Foreign Communication From a Counterpart Application, Japanese Application No. 2016-534146, Japanese Office Action dated Jan. 17, 2017, 4 pages.
Foreign Communication From a Counterpart Application, Japanese Application No. 2016-534146, English Translation of Japanese Office Action dated Jan. 17, 2017, 5 pages.

* cited by examiner

HIDING REGIONS OF A SHARED DOCUMENT DISPLAYED ON A SCREEN

CROSS-REFERENCE TO RELATED APPLICATIONS

This application is a continuation of International Application No. PCT/CN2014/075077, filed on Apr. 10, 2014, which claims priority to Chinese Patent Application No. 201310611629.5, filed on Nov. 26, 2013, both of which are hereby incorporated by reference in their entireties.

TECHNICAL FIELD

The present disclosure relates to the field of communications, and in particular, to a document presentation method and a user terminal.

BACKGROUND

As a screen of an intelligent terminal becomes bigger, there is an increasing number of scenarios that require face-to-face "sharing" with the intelligent terminal. When many people watch one screen together, a user usually does not want to share some content such as private pictures and special documents, and the user needs to screen the content before sharing.

In the prior art, a user may select to share merely some documents when sharing a screen with others in a meeting. If another document is opened during a sharing process, the other document is presented in a form such as pixelation on a screen of a person with whom documents are shared. However, such a method is only applicable to a non-face-to-face situation, and cannot resolve a problem that the person with whom documents are shared sees other private content when watching a same computer screen together with the user.

SUMMARY

The present disclosure provides a document presentation method and a user terminal, which can resolve a problem that a person with whom documents are shared sees other private content when watching a same computer screen together with a user.

A first aspect of embodiments of the present disclosure provides a document presentation method, including selecting, from all documents on a screen according to a first click position of a user, a to-be-presented document that presents content, where all the documents on the screen are shielded and invisible to the user, and identifying a selected input of the user, and adjusting a visible proportion of a shielded region of the to-be-presented document according to the identified selected input.

With reference to the first aspect of the embodiments of the present disclosure, in a first implementation manner of the first aspect of the embodiments of the present disclosure, including all the documents on the screen are the same in shape and display dimension.

With reference to the first aspect of the embodiments of the present disclosure, in a second implementation manner of the first aspect of the embodiments of the present disclosure, the selecting, from all documents on a screen according to a first click position of a user, a to-be-presented document that presents content include the following steps selecting, according to the first click position, a clicked document as the to-be-presented document, and zooming in the to-be-presented document.

With reference to the first aspect of the embodiments of the present disclosure, in a third implementation manner of the first aspect of the embodiments of the present disclosure, the selecting, from all documents on a screen according to a first click position of a user, a to-be-presented document that presents content is selecting a preset quantity of to-be-presented documents according to a position of a start point of the selected input, where the start point of the selected input is a sliding start point or a start point of a second click, and the identifying a selected input of the user, and adjusting a visible proportion of a shielded region of the to-be-presented document according to the identified selected input is identifying a sliding track of the user or a first line segment formed between start and end points of the second click, and adjusting visible proportions of shielded regions of the to-be-presented documents according to a position, a length, and a direction of the identified sliding track or first line segment on the screen, where the start and end points of the second click include the start point of the second click and an end point of the second click.

With reference to the third implementation manner of the first aspect of the embodiments of the present disclosure, in a fourth implementation manner of the first aspect of the embodiments of the present disclosure, the identifying a sliding track of the user or a first line segment formed between start and end points of the second click, and adjusting visible proportions of shielded regions of the to-be-presented documents according to a position, a length, and a direction of the identified sliding track or first line segment formed between the start and end points of the second click on the screen includes the following step if the user moves the sliding start point in a horizontal direction or the first line segment goes in a horizontal direction, adjusting the visible proportions of the shielded regions of the to-be-presented documents in a horizontally progressive presentation manner, if the user moves the sliding start point in a vertical direction or the first line segment goes in a vertical direction, adjusting the visible proportions of the shielded regions of the to-be-presented documents in a vertically progressive presentation manner, or if the sliding start point moves neither in a horizontal direction nor in a vertical direction, or the first line segment goes neither in a horizontal direction nor in a vertical direction, proportionally adjusting the visible proportions of the shielded regions of the to-be-presented documents according to the position, the length, and the direction of the sliding track on which the sliding start point is located or the position, the length, and the direction of the first line segment on the screen.

With reference to the second implementation manner of the first aspect of the embodiments of the present disclosure, in a fifth implementation manner of the first aspect of the embodiments of the present disclosure, the identifying a selected input of the user, and adjusting a visible proportion of a shielded region of the to-be-presented document according to the identified selected input includes the following steps if the identified selected input is a non-closed sliding track or a second line segment formed between start and end points of a second click, determining that a sliding start point or a start point of the second click is located on a boundary of the to-be-presented document and an end point to which the sliding start point moves or an end point of the second click is located on the to-be-presented document or on the boundary of the to-be-presented document, where the start and end points of the second click include the start point of the second click and the end point of the second click, and adjusting the visible proportion of the shielded region of the to-be-presented document according to a position, a length, and a direction of the sliding track or a position, a length, and a direction of the second line segment on the screen.

With reference to the second implementation manner of the first aspect of the embodiments of the present disclosure, in a sixth implementation manner of the first aspect of the embodiments of the present disclosure, the identifying a selected input of the user, and adjusting a visible proportion of a shielded region of the to-be-presented document according to the identified selected input includes the following step if the identified selected input is a closed sliding track, adjusting the visible proportion of the shielded region of the to-be-presented document according to an area of a closed pattern that is formed by the sliding track on the to-be-presented document.

With reference to the third implementation manner of the first aspect of the embodiments of the present disclosure, in a seventh implementation manner of the first aspect of the embodiments of the present disclosure, the selecting a preset quantity of to-be-presented documents according to a position of a start point of the selected input includes the following step if the user moves the sliding start point in a horizontal direction or a vertical direction, selecting, using a straight line that passes through the sliding start point and is perpendicular to multiple documents in the to-be-presented documents as a reference, documents at a side of a moving direction of the sliding start point as the to-be-presented documents, or if the first line segment goes in a horizontal direction or a vertical direction, selecting, using a straight line that passes through the start point of the second click and is perpendicular to multiple documents in the to-be-presented documents as a reference, documents at a side of a direction that is from the start point of the second click to the end point of the second click as the to-be-presented documents.

With reference to the seventh implementation manner of the first aspect of the embodiments of the present disclosure, in an eighth implementation manner of the first aspect of the embodiments of the present disclosure, the adjusting the visible proportions of the shielded regions of the to-be-presented documents in a horizontally progressive presentation manner includes the following steps determining visible proportions of shielded regions of the multiple documents according to areas of the multiple documents that are covered when the straight line horizontally moves with the sliding start point or covered when the straight line horizontally moves along the first line segment from the start point of the second click to the end point of the second click, and determining, according to the visible proportions of the shielded regions of the multiple documents, visible proportions of shielded regions of documents, having no intersection point with the straight line, in the to-be-presented documents.

With reference to the seventh implementation manner of the first aspect of the embodiments of the present disclosure, in a ninth implementation manner of the first aspect of the embodiments of the present disclosure, the adjusting the visible proportions of the shielded regions of the to-be-presented documents in a vertically progressive presentation manner includes the following steps determining visible proportions of shielded regions of the multiple documents according to areas of the multiple documents that are covered when the straight line vertically moves with the sliding start point or covered when the straight line vertically moves along the first line segment from the start point of the second click to the end point of the second click, and determining, according to the visible proportions of the shielded regions of the multiple documents, visible proportions of shielded regions of documents, having no intersection point with the straight line, in the to-be-presented documents.

With reference to the third implementation manner of the first aspect of the embodiments of the present disclosure, in a tenth implementation manner of the first aspect of the embodiments of the present disclosure, the selecting a preset quantity of to-be-presented documents according to a position of a start point of the selected input includes the following step if the sliding start point moves neither in a horizontal direction nor in a vertical direction or the first line segment goes neither in a horizontal direction nor in a vertical direction, selecting all the documents on the screen as the to-be-presented documents, where the sliding start point or the start point of the second click is located in any of four corners of the screen.

A second aspect of the embodiments of the present disclosure provides a user terminal, including a selection unit, configured to select, from all documents on a screen according to a first click position of a user, a to-be-presented document that presents content, where all the documents on the screen are shielded and invisible to the user, and a processing unit, configured to identify a selected input of the user, and adjust a visible proportion of a shielded region of the to-be-presented document according to the identified selected input.

With reference to the second aspect of the embodiments of the present disclosure, in a first implementation manner of the second aspect of the embodiments of the present disclosure, including all the documents on the screen are the same in shape and display dimension.

With reference to the second aspect of the embodiments of the present disclosure, in a second implementation manner of the second aspect of the embodiments of the present disclosure, the selection unit includes a first selection subunit, configured to select, according to the first click position, a clicked document as the to-be-presented document, and a zoom-in subunit, configured to zoom in the to-be-presented document.

With reference to the second aspect of the embodiments of the present disclosure, in a third implementation manner of the second aspect of the embodiments of the present disclosure, the selection unit includes a second selection subunit, configured to select a preset quantity of to-be-presented documents according to a position of a start point of the selected input, where the start point of the selected input is a sliding start point or a start point of a second click, and the processing unit is configured to identify a sliding track of the user or a first line segment formed between start and end points of the second click, and adjust visible proportions of shielded regions of the to-be-presented documents according to a position, a length, and a direction of the sliding track or the first line segment on the screen, where the start and end points of the second click include the start point of the second click and an end point of the second click.

With reference to the third implementation manner of the second aspect of the embodiments of the present disclosure, in a fourth implementation manner of the second aspect of the embodiments of the present disclosure, the processing unit includes a first processing subunit, configured to if the user moves the sliding start point in a horizontal direction or the first line segment goes in a horizontal direction, adjust the visible proportions of the shielded regions of the to-bepresented documents in a horizontally progressive presentation manner, a second processing subunit, configured to if the user moves the sliding start point in a vertical direction or the first line segment goes in a vertical direction, adjust the visible proportions of the shielded regions of the to-be-presented documents in a vertically progressive presentation manner, and a third processing subunit, configured to if the sliding start point moves neither in a horizontal direction nor in a vertical direction, or the first line segment goes neither in a horizontal direction nor in a vertical direction, proportionally adjust the visible proportions of the shielded regions of the to-be-presented documents according to the position, the length, and the direction of the sliding track on which the sliding start point is located or the position, the length, and the direction of the first line segment on the screen.

With reference to the second implementation manner of the second aspect of the embodiments of the present disclosure, in a fifth implementation manner of the second aspect of the embodiments of the present disclosure, the processing unit includes a determining subunit, configured to if the identified selected input is a non-closed sliding track or a second line segment formed between start and end points of a second click, determine that a sliding start point or a start point of the second click is located on a boundary of the to-be-presented document and an end point to which the sliding start point moves or an end point of the second click is located on the to-be-presented document or on the boundary of the to-be-presented document, where the start and end points of the second click include the start point of the second click and the end point of the second click, and an adjusting subunit, configured to adjust the visible proportion of the shielded region of the to-be-presented document according to a position, a length, and a direction of the identified sliding track or a position, a length, and a direction of the second line segment on the screen.

With reference to the second implementation manner of the second aspect of the embodiments of the present disclosure, in a sixth implementation manner of the second aspect of the embodiments of the present disclosure, including the adjusting subunit is further configured to if the identified selected input is a closed sliding track, adjust the visible proportion of the shielded region of the to-be-presented document according to an area of a closed pattern that is formed by the sliding track on the to-be-presented document.

With reference to the third implementation manner of the second aspect of the embodiments of the present disclosure, in a seventh implementation manner of the second aspect of the embodiments of the present disclosure, including the second selection subunit is further configured to if the user moves the sliding start point in a horizontal direction or a vertical direction, select, using a straight line that passes through the sliding start point and is perpendicular to multiple documents in the to-be-presented documents as a reference, documents at a side of a moving direction of the sliding start point as the to-be-presented documents, or the second selection subunit is further configured to if the first line segment goes in a horizontal direction or a vertical direction, select, using a straight line that passes through the start point of the second click and is perpendicular to multiple documents in the to-be-presented documents as a reference, documents at a side of a direction that is from the start point of the second click to the end point of the second click as the to-be-presented documents.

With reference to the seventh implementation manner of the second aspect of the embodiments of the present disclosure, in an eighth implementation manner of the second aspect of the embodiments of the present disclosure, the first processing subunit is further configured to execute the following procedure determining visible proportions of shielded regions of the multiple documents according to areas of the multiple documents that are covered when the straight line horizontally moves with the sliding start point or covered when the straight line horizontally moves along the first line segment from the start point of the second click to the end point of the second click, and determining, according to the visible proportions of the shielded regions of the multiple documents, visible proportions of shielded regions of documents, having no intersection point with the straight line, in the to-be-presented documents.

With reference to the seventh implementation manner of the second aspect of the embodiments of the present disclosure, in a ninth implementation manner of the second aspect of the embodiments of the present disclosure, the second processing subunit is further configured to execute the following procedure determining visible proportions of shielded regions of the multiple documents according to areas of the multiple documents that are covered when the straight line vertically moves with the sliding start point or covered when the straight line vertically moves along the first line segment from the start point of the second click to the end point of the second click, and determining, according to the visible proportions of the shielded regions of the multiple documents, visible proportions of shielded regions of documents, having no intersection point with the straight line, in the to-be-presented documents.

With reference to the third implementation manner of the second aspect of the embodiments of the present disclosure, in a tenth implementation manner of the second aspect of the embodiments of the present disclosure, including the second selection subunit is further configured to if the sliding start point moves neither in a horizontal direction nor in a vertical direction or the first line segment goes neither in a horizontal direction nor in a vertical direction, select all the documents on the screen as the to-be-presented documents, where the sliding start point or the start point of the second click is located in any of four corners of the screen.

In the embodiments of the present disclosure, a user terminal selects, from all documents on a screen according to a first click position of a user, a to-be-presented document that presents content, where all the documents on the screen are shielded and invisible to the user, identifies a selected input of the user, and adjusts a visible proportion of a shielded region of the to-be-presented document according to the identified selected input. In this way, when the user and a person with whom documents are shared watch a same computer screen together, the user terminal presents merely a document that needs to be shared, and the user terminal can correspondingly present a partial region of the to-be-presented document according to the selected input of the user, thereby avoiding excessive exposure of information when a shared document is browsed.

DESCRIPTION OF EMBODIMENTS

Embodiments of the present disclosure provide a document presentation method and a user terminal, which enable the user terminal to present solely a document that needs to be shared, and correspondingly present a partial region of a to-be-presented document according to a selected input of a user, thereby avoiding excessive exposure of information when a shared document is browsed.

Figure 1:
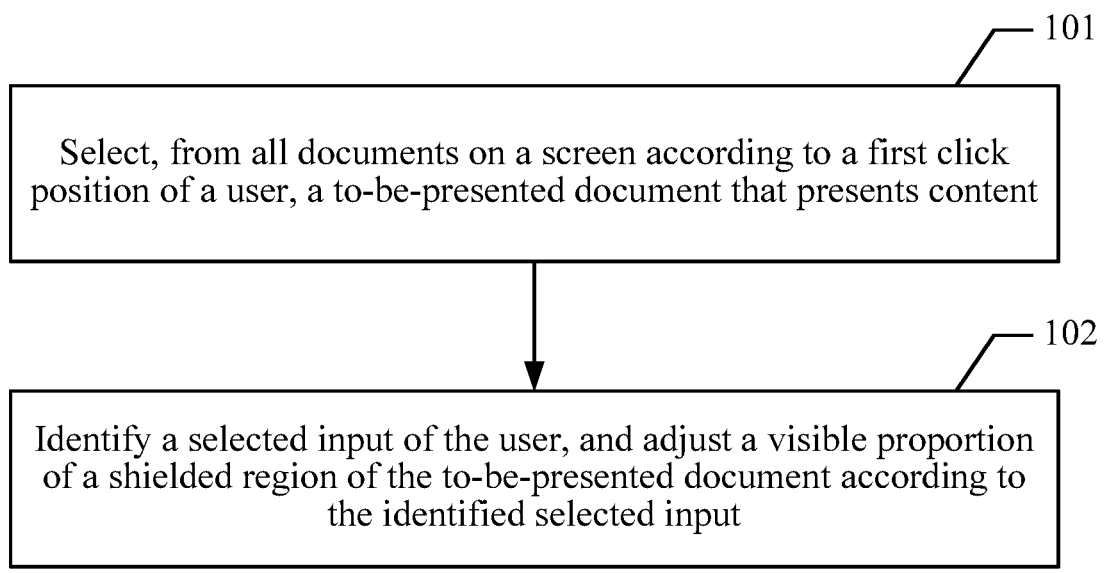
FIG. 1 is a schematic diagram of an embodiment of a document presentation method according to an embodiment of the present disclosure.

Referring to FIG. 1, an embodiment of a document presentation method according to an embodiment of the present disclosure includes the following steps:

101. Select, from all documents on a screen according to a first click position of a user, a to-be-presented document that presents content.

In this embodiment, a user terminal may select, from all the documents on the screen according to the first click position of the user on the screen, the to-be-presented document that presents content, where all the documents on the screen are shielded and are invisible to the user. In actual application, content of the documents is not limited, which may be text content, pictures, or image content, a clicking manner of the user on the screen is not limited, and the user may touch the screen with a finger, click the screen with a mouse, or touch the screen with a stylus. Certainly, in addition to a manner of touching with a finger or clicking with a mouse, a person skilled in the art may obviously acquire other clicking manners.

In actual application, an implementation manner for shielding the documents is also not limited. The user may shield, using a physical button, a virtual button, or a specified gesture, all the documents displayed on the screen.

102. Identify a selected input of the user, and adjust a visible proportion of a shielded region of the to-be-presented document according to the identified selected input.

In this embodiment, the user terminal may identify the selected input of the user, and adjust the visible proportion of the shielded region of the to-be-presented document according to the identified selected input. In actual application, the selected input of the user may be a sliding track, a click, or a non-touch input, which is not limited herein.

It should be noted that, the user terminal in the present disclosure may be a device with a touchscreen, or may be a device without a touchscreen. When the user terminal is a device without a touchscreen, an operation may be performed on the screen using a mouse instead of a sliding operation performed by a finger.

In this embodiment, a user terminal selects, from all documents on a screen according to a first click position of a user, a to-be-presented document that presents content, where all the documents on the screen are shielded and invisible to the user, identifies a selected input of the user, and adjusts a visible proportion of a shielded region of the to-be-presented document according to the identified selected input. In this way, when the user and a person with whom documents are shared watch a same computer screen together, the user terminal presents solely a document that needs to be shared, and the user terminal can correspondingly present a partial region of the to-be-presented document according to the selected input of the user, thereby avoiding excessive exposure of information when a shared document is browsed.

Figure 2:
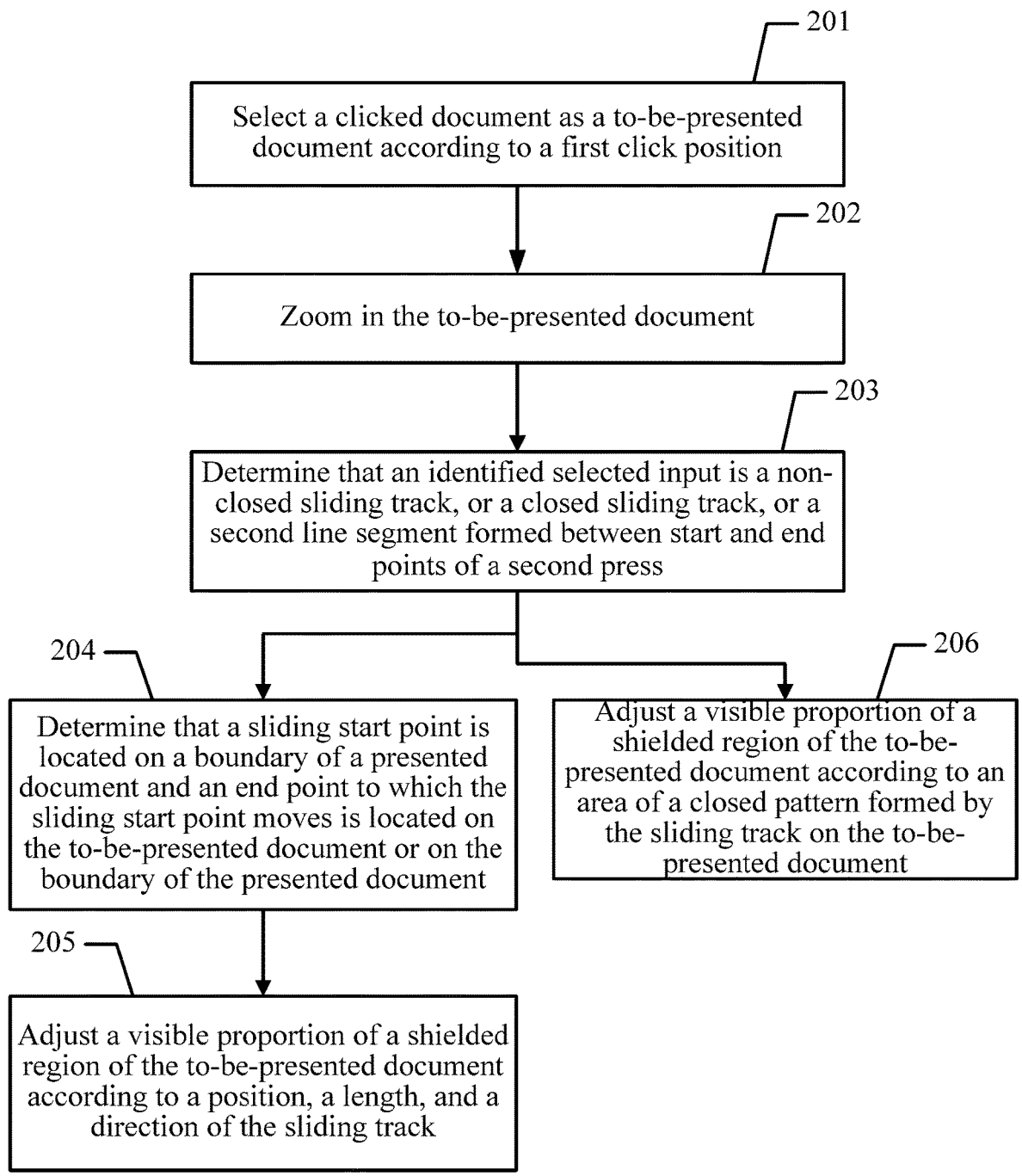
FIG. 2 is a schematic diagram of another embodiment of a document presentation method according to an embodiment of the present disclosure.

For ease of understanding, a document presentation method according to an embodiment of the present disclosure is described in the following using a specific example in which there is one to-be-presented document. FIG. 2 shows another embodiment of the document presentation method according to this embodiment of the present disclosure includes the following steps:

201. Select a clicked document as a to-be-presented document according to a first click position.

In this embodiment, a user terminal may select the clicked document as the to-be-presented document according to the first click position. Before a user performs clicking, all documents on a screen are shielded and invisible to the user. Optionally, all the documents on the screen are the same in shape and display dimension. In actual application, content of the documents is not limited, which may be text content, pictures, or image content, a manner for shielding the documents by the user is not limited, and the user may shield the documents on the screen by clicking a specified physical button or virtual button on the user terminal with a finger or may shield the documents on the screen by a specified gesture, and then all the documents on the screen are shielded according to an instruction of the user and are invisible to the user. Optionally, the user may shield, in a tap mode as required, a document that needs the user to shield (for example, clicking and holding down the document).

Figure 3:
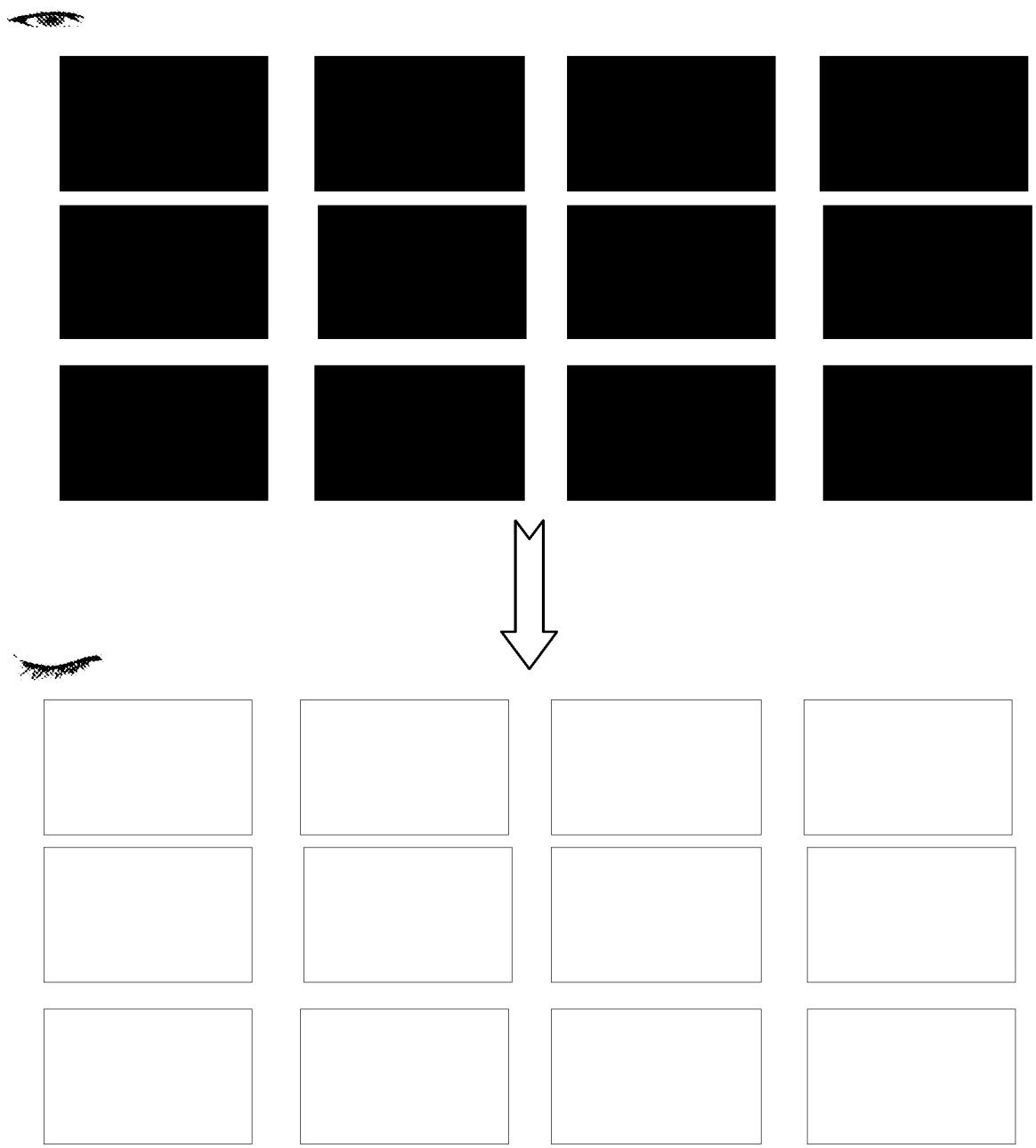
FIG. 3 is a schematic diagram illustrating a case before and after documents are shielded according to an embodiment of the present disclosure.

FIG. 3 is a schematic diagram illustrating a case before and after documents are shielded. In FIG. 3, black rectangles represent visible documents (documents before being shielded), and white rectangles represent invisible documents (documents after being shielded), where documents are the same in shape and display dimension. FIG. 3 merely shows an example about an arrangement form of the documents, and shapes and display dimensions of the documents, a person skilled in the art may adjust arrangement of the documents, and the shapes and display dimensions of the documents according to a size of a screen of the user terminal, which are not limited herein.

Optionally, the user terminal may have two modes, which are a privacy mode and a shared mode. When all the documents on the screen are shielded according to the instruction of the user and are invisible to the user, the user terminal enables the privacy mode.

202. Zoom in the to-be-presented document.

Figures 4A, 4B, 4C:
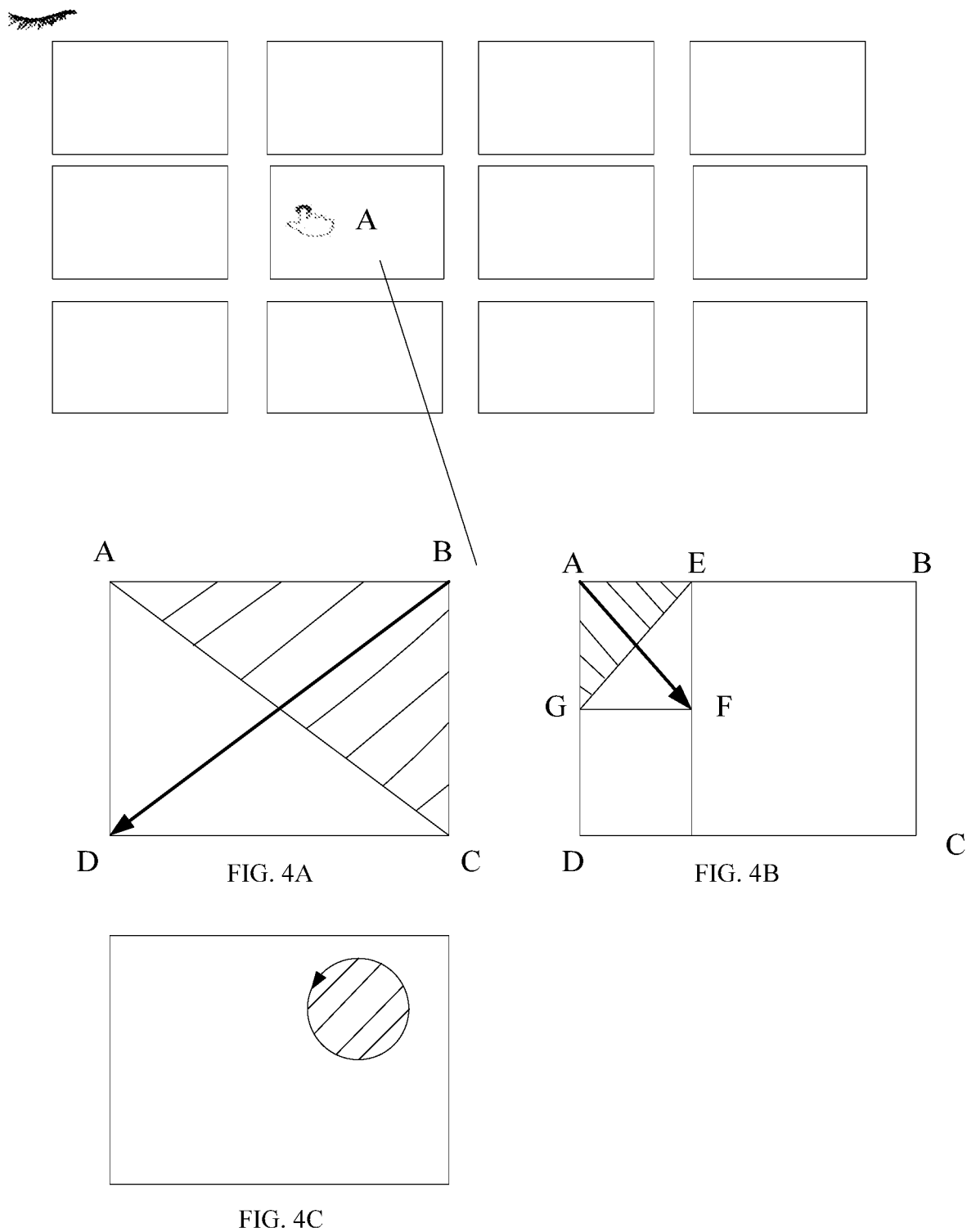
FIGS. 4A, 4B, and 4C are schematic diagrams of a document presentation method when there is one to-be-presented document according to an embodiment of the present disclosure.

In this embodiment, after step 201, the user terminal zooms in the to-be-presented document. As shown in FIG. 4, the user clicks a document A as the to-be-presented document from all the shielded documents on the screen, and FIG. 4A, FIG. 4B, or FIG. 4C shows the to-be-presented document (the document A) after the document is zoomed in.

It should be noted that, FIGS. 4A-C are merely examples about the to-be-presented document after the document is zoomed in, and a zoom-in ratio of the to-be-presented document is not limited in this embodiment of the present disclosure, a fixed zoom-in ratio may be set by the user according to the size of the screen of the user terminal. Certainly, the user may also zoom in the to-be-presented document according to preference of the user by a gesture or a mouse, or in another manner.

203. Determine that an identified selected input is a non-closed sliding track, or a closed sliding track, or a second line segment formed between start and end points of a second click, and perform step 204 if the selected input is the non-closed sliding track or the second line segment formed between the start and end points of the second click, or perform step 206 if the selected input is the closed sliding track.

In this embodiment, the start and end points of the second click include a start point of the second click and an end point of the second click. The user terminal may identify the selected input of the user, and may first determine whether the identified selected input is a sliding input or a clicking input. If the selected input is the sliding input, it is determined that the identified selected input is the non-closed sliding track or the closed sliding track. if the selected input is the clicking input, it is determined that the identified selected input is the second line segment formed between the start and end points of the second click. In actual application, the second line segment belongs to a non-closed track. Perform step 204 if the selected input is the non-closed sliding track or the second line segment formed between the start and end points of the second click, or perform step 206 if the selected input is the closed sliding track.

204. Determine that a sliding start point or a start point of the second click is located on a boundary of a presented document and an end point to which the sliding start point moves or an end point of the second click is located on the to-be-presented document or on the boundary of the presented document.

205. Adjust a visible proportion of a shielded region of the to-be-presented document according to a position, a length, and a direction of the sliding track or a position, a length, and a direction of the second line segment on a screen.

In this embodiment, when the user terminal identifies that the selected input of the user is the non-closed sliding track or the second line segment formed between the start and end points of the second click, in actual application, the user terminal may identify the sliding track, or the start point and the end point of the second click using a sensor, then determine that the sliding start point or the start point of the second click is located on the boundary of the presented document and the end point to which the sliding start point moves or the end point of the second click is located on the to-be-presented document or on the boundary of the presented document, and adjust the visible proportion of the shielded region of the to-be-presented document according to the position, the length, and the direction of the sliding track or the position, the length, and the direction of the second line segment on the screen, where the sliding start point is a start point of the non-closed sliding track. In actual application, the user terminal can calculate the visible proportion according to the position, the length, and the direction of the sliding track or the position, the length, and the direction of the second line segment on the screen, and then adjust the visible proportion of the shielded region of the to-be-presented document. The calculating, by the user terminal, the visible proportion according to the position, the length, and the direction of the sliding track or the position, the length, and the direction of the second line segment on the screen is not described in detail herein.

Refer to FIGS. 4A and 4B. As shown in FIG. 4A, using the sliding track as an example, a non-closed sliding track is indicated by a black arrow in FIG. 4A, where a sliding start point of the sliding track is a point B, and an end point to which the sliding start point moves is a point D. A visible proportion that is calculated according to a position, a length, and a direction of the sliding track is indicated by a shaded part (that is, a triangle having three points A, B, and C).

In addition, using the second line segment formed by the second click as an example, the second line segment is indicated by the black arrow in FIG. 4A, where a start point of the second line segment is the point B and an end point of the second line segment is the point D. Using a calculation method same as that for the sliding track, a visible proportion is calculated according to a position, a length, and a direction of the second line segment on the screen and is indicated by the shaded part (that is, the triangle having three points A, B, and C).

As shown in FIG. 4B, the sliding track is a black arrow in FIG. 4B, where a sliding start point of the sliding track is a point A and an end point to which the sliding start point moves is a point F, and a visible proportion that is calculated according to a position, a length, and a direction of the sliding track is indicated by a shaded part (that is, a triangle having three points A, E, and G).

In addition, using the second line segment formed by the second click as an example, the second line segment is indicated by the black arrow in FIG. 4B, where a start point of the second line segment is the point A and an end point of the second line segment is the point F. Using a calculation method same as that for the sliding track, a visible proportion is calculated according to a position, a length, and a direction of the second line segment on the screen and is indicated by the shaded part (that is, the triangle having three points A, E, and G).

It should be noted that, the sliding start point or the start point of the second line segment may be located on any boundary of the to-be-presented document.

206. Adjust a visible proportion of a shielded region of the to-be-presented document according to an area of a closed pattern formed by the sliding track on the to-be-presented document.

In this embodiment, when the user terminal identifies that the selected input of the user is a closed sliding track, in actual application, the user terminal may identify the sliding track using a sensor, where the sliding track may be a circle, a rectangle, a triangle, or another closed pattern, which is not limited herein, and then the user terminal adjusts the visible proportion of the shielded region of the to-be-presented document according to an area of the closed pattern formed by the sliding track on the to-be-presented document. In actual application, the closed pattern formed by the sliding track is a visible region in a shielded region of the to-be-presented document, and as shown in FIG. 4C, the sliding track is a closed circle, and a shaded part in the circle indicates a region, having visible content, of the to-be-presented document.

In this embodiment, a user terminal selects a clicked document as a to-be-presented document according to a first click position, zooms in the to-be-presented document, if an identified sliding track is a non-closed sliding track or a second line segment formed between start and end points of a second click, determines that a sliding start point or a start point of the second click is located on a boundary of the to-be-presented document and an end point to which the sliding start point moves or an end point of the second click is located on the to-be-presented document or on the boundary of the to-be-presented document, and adjusts a visible proportion of a shielded region of the to-be-presented document according to a position, a length, and a direction of the sliding track or a position, a length, and a direction of the second line segment on a screen, or if an identified selected input is a closed sliding track, adjusts a visible proportion of a shielded region of the to-be-presented document according to an area of a closed pattern formed by the sliding track on the to-be-presented document. In this way, when a user and a person with whom documents are shared watch a same computer screen together, the user terminal presents merely a document that needs to be shared, and the user terminal can correspondingly present a partial region of the to-be-presented document according to the selected input of the user, thereby avoiding excessive exposure of information when a shared document is browsed.

Figure 5A:
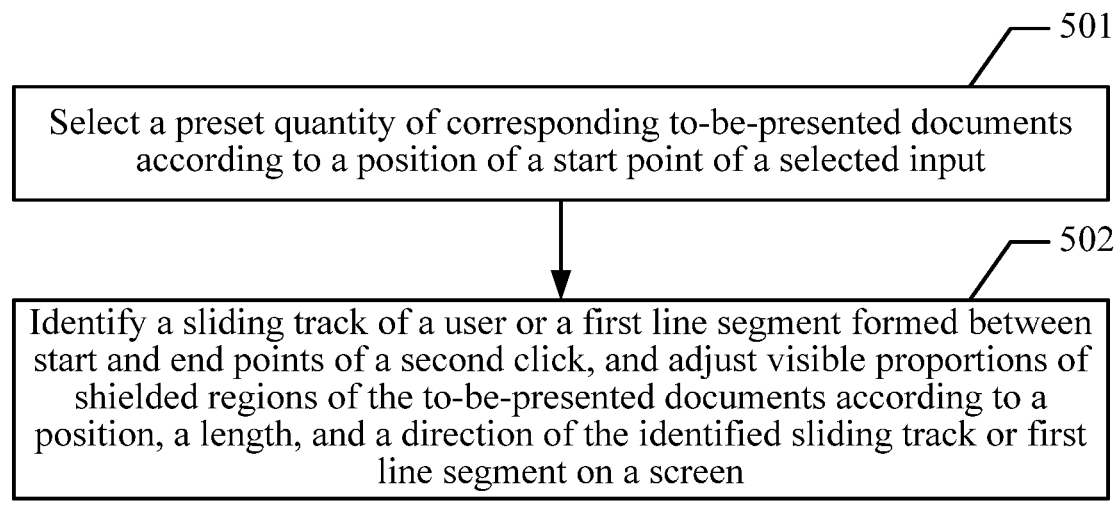
FIG. 5A is a schematic diagram of another embodiment of a document presentation method according to an embodiment of the present disclosure.

A document presentation method according to an embodiment of the present disclosure is described in the following using a specific example in which there are multiple to-be-presented documents. Referring to FIG. 5A, another embodiment of the document presentation method according to this embodiment of the present disclosure includes the following steps:

501. Select a preset quantity of to-be-presented documents according to a position of a start point of a selected input.

In this embodiment, a user terminal may select the preset quantity of to-be-presented documents according to the position of the start point of the selected input of a user, where the start point of the selected input is a sliding start point or a start point of a second click. In actual application, a quantity of the corresponding to-be-presented documents varies with the position of the start point of the selected input on a screen.

Before the to-be-presented documents are selected, all documents on the screen are shielded and invisible to the user, and documents on the screen are the same in shape and display dimension. In actual application, content of the documents is not limited, which may be text content, pictures, or image content, a manner for shielding the documents by the user is not limited, and the user may shield the documents on the screen by clicking a specified physical button or virtual button on the user terminal with a finger or may shield the documents on the screen by a specified gesture, and then all the documents on the screen are shielded according to an instruction of the user and are invisible to the user. Optionally, the user may shield, in a tap mode as required, a document that needs the user to shield (for example, clicking and holding down the document).

Optionally, the user terminal may have two modes, which are a privacy mode and a shared mode. When all the documents on the screen are shielded according to the instruction of the user and are invisible to the user, the user terminal enables the privacy mode.

502. Identify a sliding track of a user or a first line segment formed between start and end points of a second click, and adjust visible proportions of shielded regions of the to-be-presented documents according to a position, a length, and a direction of the identified sliding track or first line segment on a screen.

In this embodiment, after step 501, the user terminal may identify the sliding track of the user or the first line segment formed between the start and end points of the second click, and adjust the visible proportions of the shielded regions of the to-be-presented documents according to the position, the length, and the direction of the identified sliding track or first line segment on the screen, where the start and end points of the second click include the start point of the second click and an end point of the second click.

In this embodiment, a preset quantity of to-be-presented documents are selected according to a position of a start point of a selected input, then a sliding track of a user or a first line segment formed between start and end points of a second click is identified, and visible proportions of shielded regions of the to-be-presented documents are adjusted according to a position, a length, and a direction of the identified sliding track or first line segment on a screen. In this way, when the user and a person with whom documents are shared watch a same computer screen together, a user terminal presents merely documents that need to be shared, and the user terminal can correspondingly present partial regions of the to-be-presented documents according to the selected input of the user, thereby avoiding excessive exposure of information when shared documents are browsed.

Figure 5B:
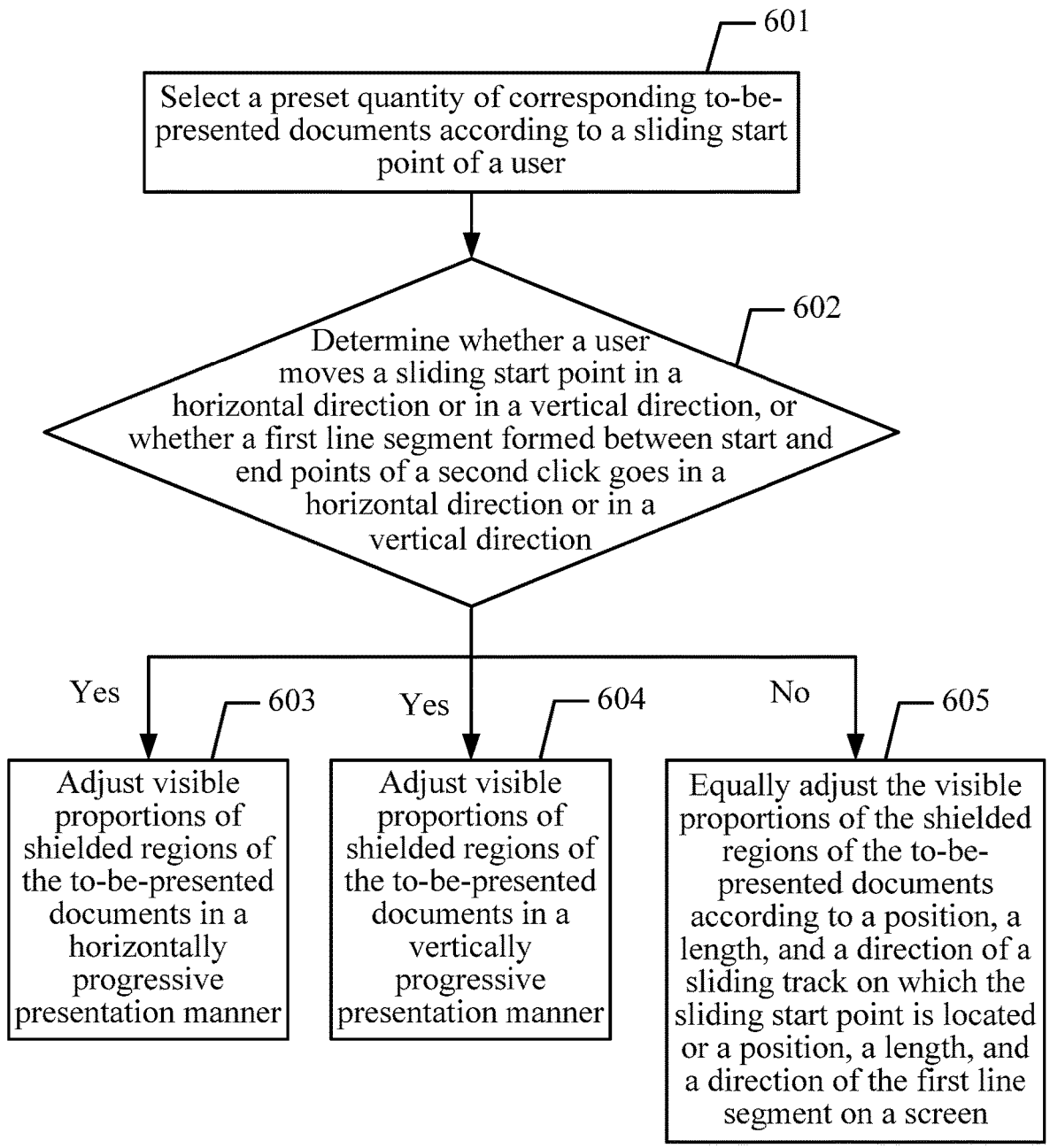
FIG. 5B is a schematic diagram of another embodiment of a document presentation method according to an embodiment of the present disclosure.

A document presentation method according to an embodiment of the present disclosure is described in the following using a specific example in which there are multiple to-be-presented documents. Referring to FIG. 5B, another embodiment of the document presentation method according to this embodiment of the present disclosure includes the following steps:

Step 601 is the same as step 501 in the foregoing embodiment, and details are not described herein.

602. Determine whether a user moves a sliding start point in a horizontal direction or in a vertical direction, or whether a first line segment formed between start and end points of a second click goes in a horizontal direction or in a vertical direction, if yes, perform step 603 or 604, if not, perform step 605.

In this embodiment, a user terminal may determine whether the user moves the sliding start point in a horizontal direction or in a vertical direction, or a user terminal may determine whether the first line segment formed between the start and end points of the second click goes in a horizontal direction or in a vertical direction, if the user moves the sliding start point in the horizontal direction or the first line segment goes in the horizontal direction, perform step 603, if the user moves the sliding start point in the vertical direction or the first line segment goes in the vertical direction, perform step 604, or if the sliding start point moves or the first line segment goes neither in the horizontal direction nor in the vertical direction, perform step 605.

603. Adjust visible proportions of shielded regions of the to-be-presented documents in a horizontally progressive presentation manner.

604. Adjust visible proportions of shielded regions of the to-be-presented documents in a vertically progressive presentation manner.

In this embodiment, when the user moves the sliding start point in the horizontal direction or the first line segment goes in the horizontal direction, the user terminal may adjust the visible proportions of the shielded regions of the to-be-presented documents in a horizontally progressive presentation manner, when the user moves the sliding start point in the vertical direction or the first line segment goes in the vertical direction, the user terminal may adjust the visible proportions of the shielded regions of the to-be-presented documents in a vertically progressive presentation manner.

605. Proportionally adjust the visible proportions of the shielded regions of the to-be-presented documents according to a position, a length, and a direction of a sliding track on which the sliding start point is located or a position, a length, and a direction of the first line segment on a screen.

In this embodiment, if the sliding start point moves neither in the horizontal direction nor in the vertical direction, or the first line segment goes neither in the horizontal direction nor in the vertical direction, the user terminal may proportionally adjust the visible proportions of the shielded regions of the to-be-presented documents according to the position, the length, and the direction of the sliding track on which the sliding start point is located or the position, the length, and the direction of the first line segment on the screen. In actual application, the proportionally adjusting the visible proportions of the shielded regions of the to-be-presented documents according to the position, the length, and the direction of the sliding track on which the sliding start point is located or the position, the length, and the direction of the first line segment on the screen belongs to the prior art, and is not described in detail herein.

Figure 6:
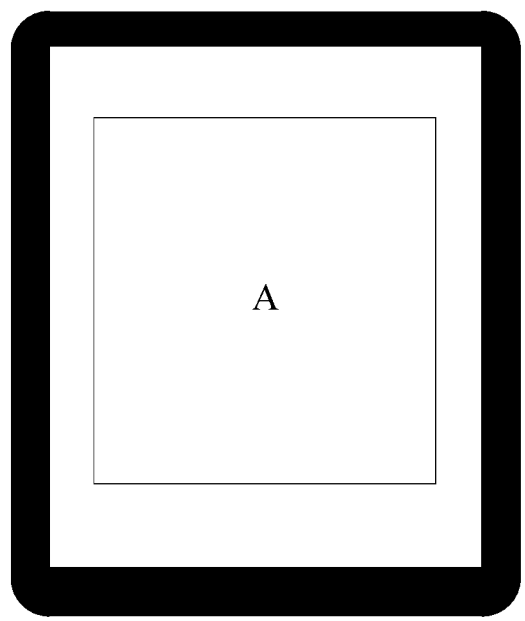
FIG. 6 is a schematic diagram of a screen of a user terminal according to an embodiment of the present disclosure.

In actual application, reference may be made to FIG. 6, which is a schematic diagram of a screen of a user terminal. In FIG. 6, a white part is the screen of the user terminal, a region A on the screen may be used as a document display region, regions excluding the region A on the screen may be used as sliding and touching regions, and the user may perform a sliding or clicking operation on the sliding and touching regions in order to operate the to-be-presented documents in the document display region. Certainly, FIG. 6 merely shows an example, and a person skilled in the art may adjust a position of the document display region on the screen of the user terminal, where the position of the document display region on the screen is not limited.

In this embodiment, a preset quantity of to-be-presented documents are selected according to a position of a start point of a selected input, if a user moves a sliding start point in a horizontal direction or a first line segment goes in a horizontal direction, visible proportions of shielded regions of the to-be-presented documents are adjusted in a horizontally progressive presentation manner, if a user moves a sliding start point in a vertical direction or a first line segment goes in a vertical direction, visible proportions of shielded regions of the to-be-presented documents are adjusted in a vertically progressive presentation manner, if a sliding start point moves neither in a horizontal direction nor in a vertical direction, or a first line segment goes neither in a horizontal direction nor in a vertical direction, visible proportions of shielded regions of the to-be-presented documents are proportionally adjusted according to a position, a length, and a direction of a sliding track on which the sliding start point is located or a position, a length, and a direction of the first line segment on a screen. In this way, when the user and a person with whom documents are shared watch a same computer screen together, and there are multiple documents that need to be shared, a user terminal can adjust, in batches according to different gestures of the user, visible proportions of shielded regions of the documents that need to be shared such that the user terminal presents merely documents that need to be shared and the user terminal can correspondingly present, according to the selected input of the user, partial regions of the multiple documents, thereby avoiding excessive exposure of information when shared documents are browsed.

Figure 7A:
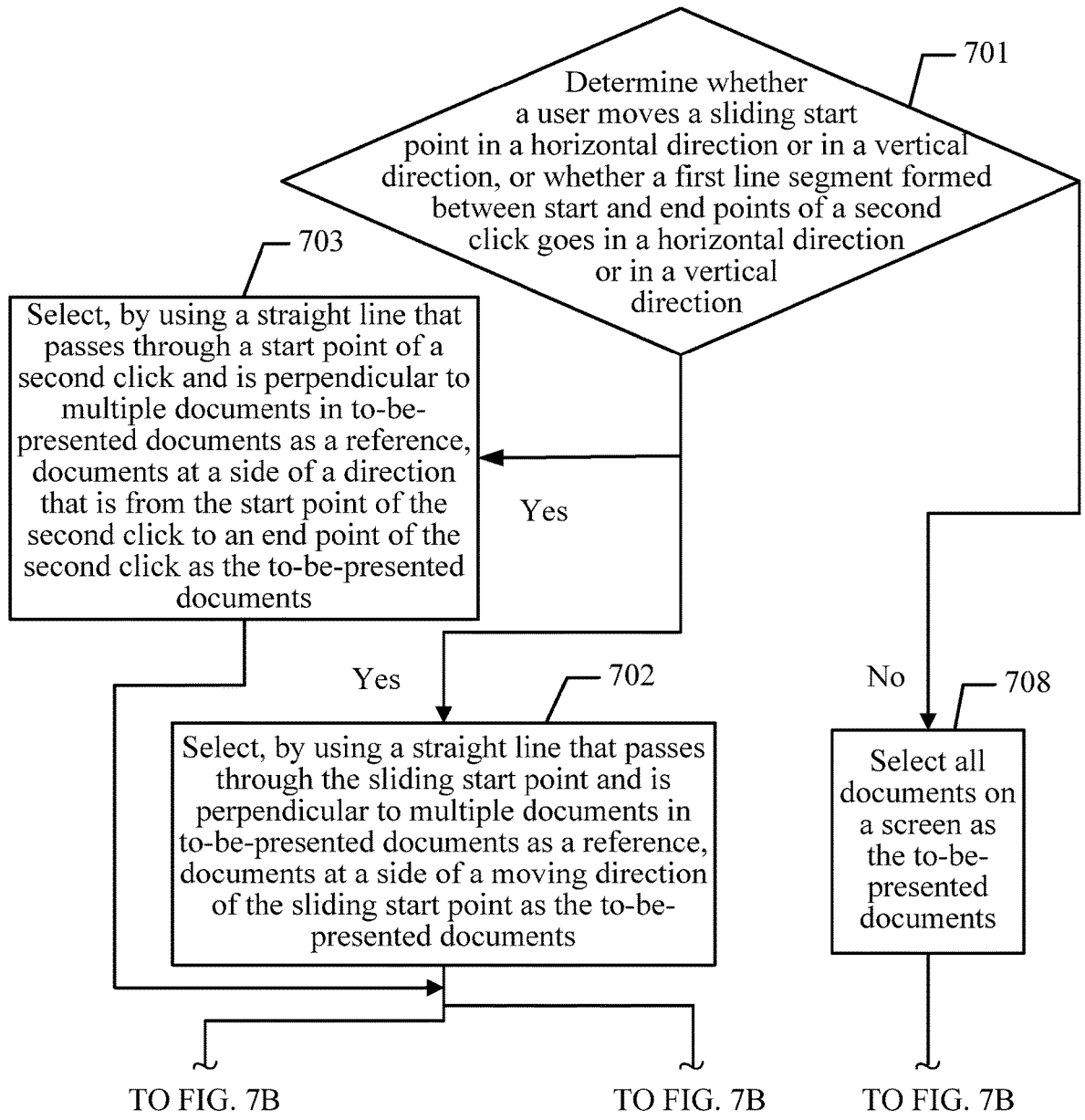
FIG. 7A and FIG. 7B are a schematic diagram of another embodiment of a document presentation method according to an embodiment of the present disclosure.
Figure 7B:
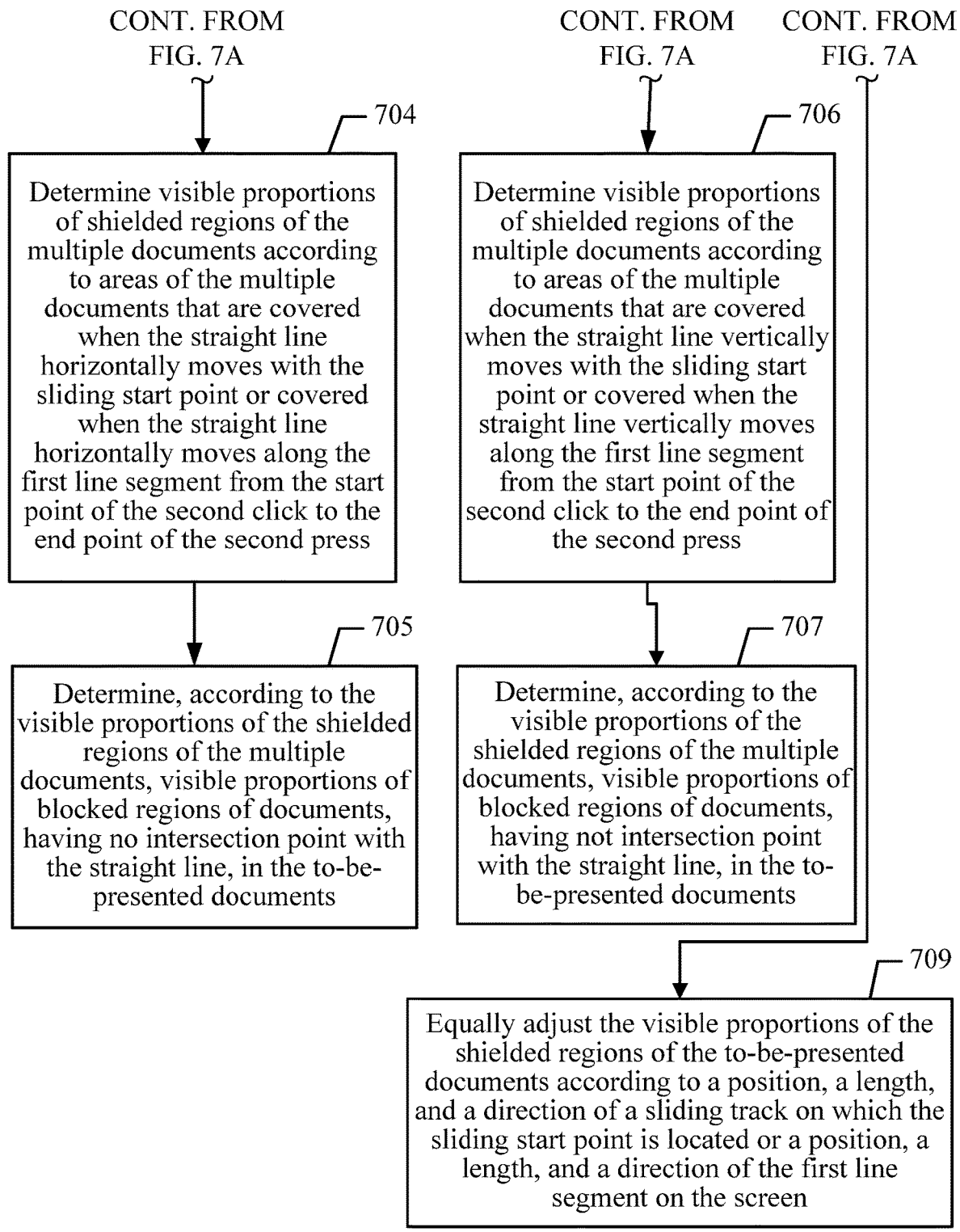

A document presentation method according to an embodiment of the present disclosure is described in the following using a specific example in which there are multiple to-be-presented documents. Referring to FIG. 7A and FIG. 7B, another embodiment of the document presentation method according to this embodiment of the present disclosure includes the following steps:

701. Determine whether a user moves a sliding start point in a horizontal direction or in a vertical direction, or whether a first line segment formed between start and end points of a second click goes in a horizontal direction or in a vertical direction, if yes, perform step 702 or 703, if not, perform step 708.

In this embodiment, a user terminal determines whether a sliding direction of the sliding start point from which the user starts to slide is the horizontal direction or the vertical direction, or a user terminal determines whether the first line segment formed between the start and end points of the second click goes in the horizontal direction or in the vertical direction, if yes, performs step 702 or 703, if not, performs step 708. In actual application, the determining, by the user terminal, whether a user moves a sliding start point in a horizontal direction or in a vertical direction is just determining a direction of a sliding track on which the sliding start point is located.

Before the determining, all documents on a screen are shielded and invisible to the user, and documents on the screen are the same in shape and display dimension. In actual application, content of the documents is not limited, which may be text content, pictures, or image content, a manner for shielding the documents by the user is not limited, and the user may shield the documents on the screen by clicking a specified physical button or virtual button on the user terminal with a finger or may shield the documents on the screen by a specified gesture, and then all the documents on the screen are shielded according to an instruction of the user and are invisible to the user. Optionally, the user may shield, in a tap mode as required, a document that needs the user to shield (for example, clicking and holding down the document).

Optionally, the user terminal may have two modes, which are a privacy mode and a shared mode. When all the documents on the screen are shielded according to the instruction of the user and are invisible to the user, the user terminal enables the privacy mode.

702. Select, using a straight line that passes through the sliding start point and is perpendicular to multiple documents in to-be-presented documents as a reference, documents at a side of a moving direction of the sliding start point as the to-be-presented documents.

In this embodiment, if a result of the determining in step 701 is that the user moves the sliding start point in a horizontal direction or in a vertical direction, documents at a side of a moving direction of the sliding start point are selected as the to-be-presented documents using a straight line that passes through the sliding start point and that is perpendicular to multiple documents in the to-be-presented documents as a reference.

For example, referring to FIG. 8 and FIG. 9, FIG. 8 is a schematic diagram illustrating that shielded regions of to-be-presented documents are adjusted when a selected input is in a horizontal direction, and FIG. 9 is a schematic diagram illustrating that shielded regions of to-be-presented documents are adjusted when a selected input is in a vertical direction. It should be noted that, documents shown in FIG. 8 and FIG. 9 are all documents displayed on the screen of the user terminal, where all the documents are shielded and are invisible to the user. In actual application, a straight line A in FIG. 8 and a straight line B in FIG. 9 are both invisible to the user.

Figure 8A:
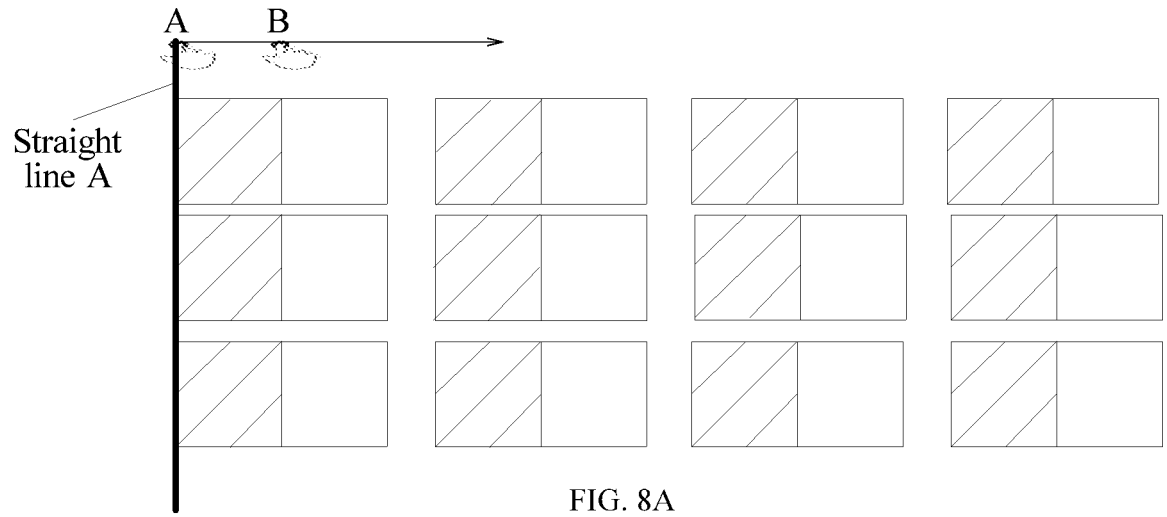
FIGS. 8A, 8B, and 8C are schematic diagrams illustrating that shielded regions are adjusted when a selected input is in a horizontal direction according to an embodiment of the present disclosure.
Figure 8B:
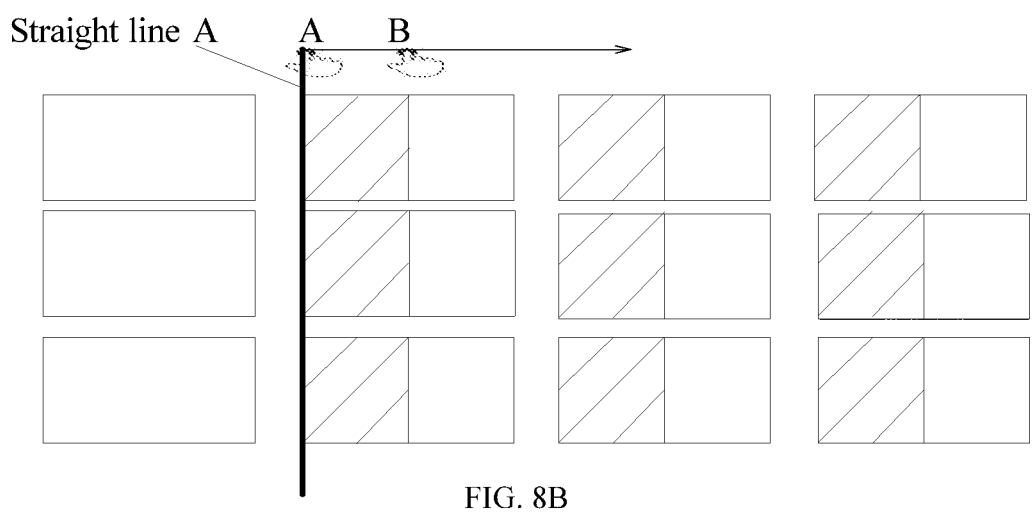
Figure 8C:
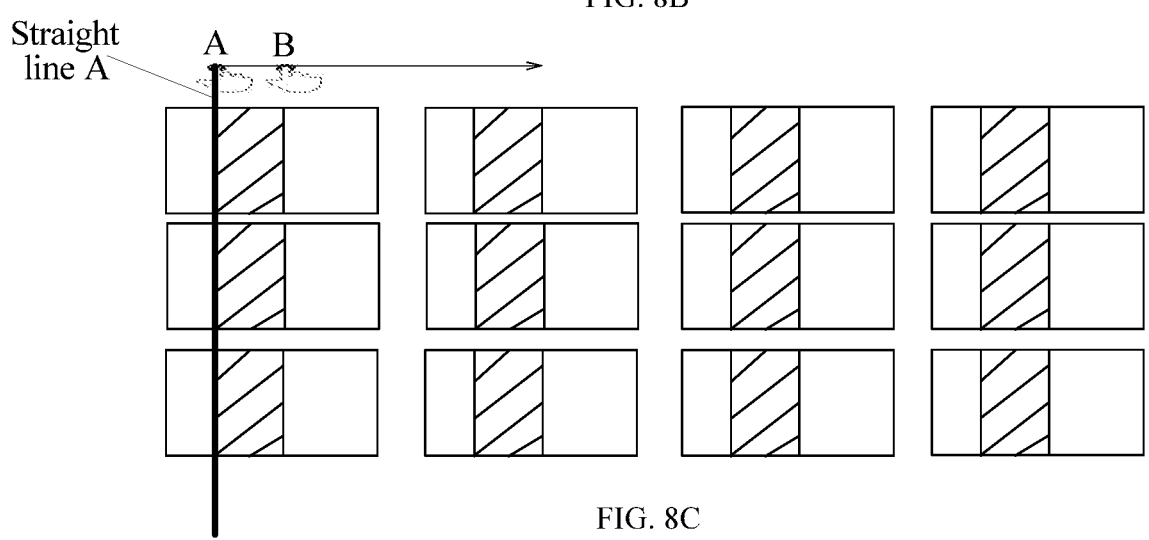

As shown in FIGS. 8A-C, the straight line A, on which a sliding start point A is located, FIG. 8A, FIG. 8B, or FIG. 8C is a straight line perpendicular to multiple documents in to-be-presented documents. Using the straight line A as a reference, documents at a side of a horizontal moving direction of the sliding start point A are the to-be-presented documents, where all documents (that is, documents with shaded parts) in FIG. 8A are the to-be-presented documents, other documents excluding those in the first column in FIG. 8B are the to-be-presented documents (that is, documents with shaded parts), and all documents (that is, documents with shaded parts) in FIG. 8C are the to-be-presented documents.

It should be noted that, in FIG. 8A, the documents are the same in shape and display dimension, the documents in FIG. 8B are the same in shape and display dimension, and the documents in FIG. 8C are the same in shape and display dimension.

Figure 9A:
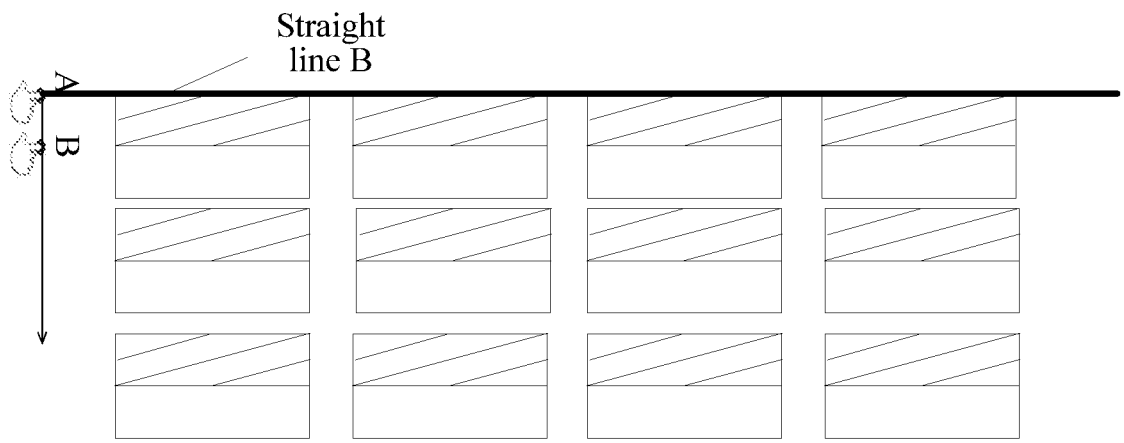
FIGS. 9A, 9B, and 9C are schematic diagrams illustrating that shielded regions are adjusted when a selected input is in a vertical direction according to an embodiment of the present disclosure.
Figure 9B:
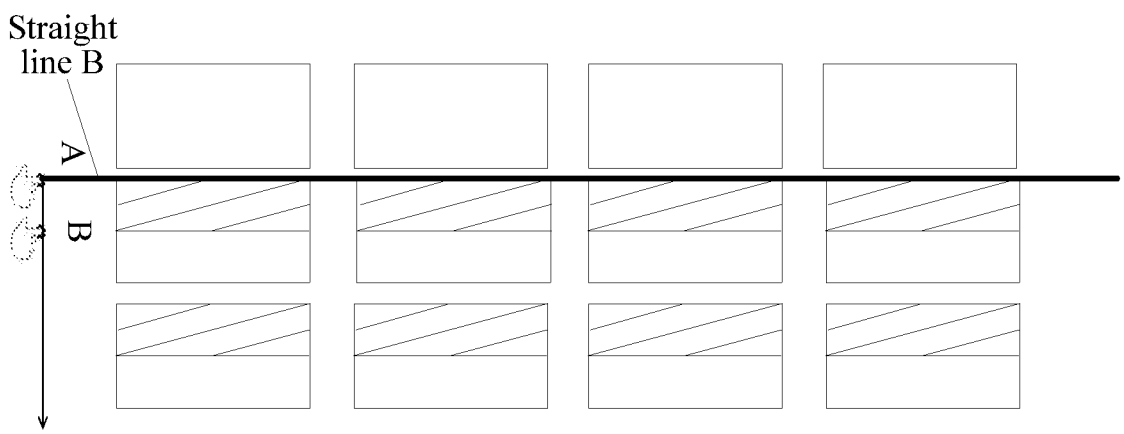
Figure 9C:
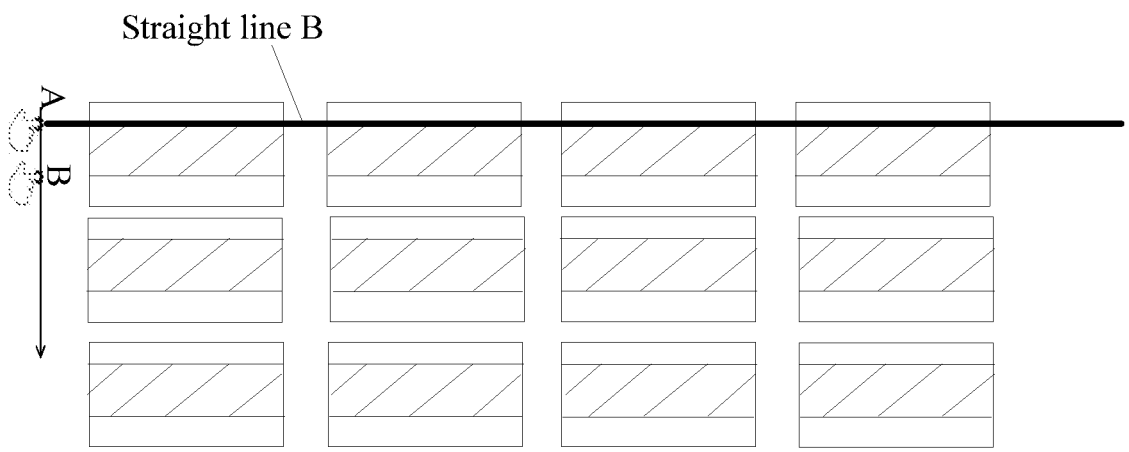

As shown in FIGS. 9A-C, the straight line B, on which the sliding start point A is located, in FIG. 9A, FIG. 9B, or FIG. 9C is a straight line perpendicular to multiple documents in to-be-presented documents. Using the straight line B as a reference, documents at a side of a vertical moving direction of the sliding start point A are the to-be-presented documents, where all documents (that is, documents with shaded parts) in FIG. 9A are the to-be-presented documents, other documents excluding those in the first column in FIG. 9B are the to-be-presented documents (that is, documents with shaded parts), and all documents (that is, documents with shaded parts) in FIG. 9C are the to-be-presented documents.

It should be noted that, in FIG. 9A, the documents are the same in shape and display dimension, the documents in FIG. 9B are the same in shape and display dimension, and the documents in FIG. 9C are the same in shape and display dimension.

703. Select, using a straight line that passes through a start point of a second click and is perpendicular to multiple documents in to-be-presented documents as a reference, documents at a side of a direction that is from the start point of the second click to an end point of the second click as the to-be-presented documents.

In this embodiment, if it is determined in step 701 that the first line segment goes in the horizontal direction or in the vertical direction, documents at a side of a direction from the start point of the second click to the end point of the second click are selected as the to-be-presented documents using the straight line that passes through the start point of the second click and that is perpendicular to the multiple documents in the to-be-presented documents as a reference.

As shown in FIGS. 8A-C, the straight line A, on which a start point A of a second click is located, in FIG. 8A, FIG. 8B, or FIG. 8C is a straight line perpendicular to multiple documents in to-be-presented documents. Using the straight line A as a reference, documents at a side of a horizontal direction that is from the start point A of the second click to an end point B of the second click are the to-be-presented documents, where all documents (that is, documents with shaded parts) in FIG. 8A are the to-be-presented documents, other documents excluding those in the first column in FIG. 8B are the to-be-presented documents (that is, documents with shaded parts), and all documents (that is, documents with shaded parts) in FIG. 8C are the to-be-presented documents.

As shown in FIGS. 9A-C, the straight line B, on which the start point A of the second click is located, in FIG. 9A, FIG. 9B, or FIG. 9C is a straight line perpendicular to multiple documents in to-be-presented documents. Using the straight line B as a reference, documents at a side of a vertical direction that is from the start point A of the second click to an end point B of the second click are the to-be-presented documents, where all documents (that is, documents with shaded parts) in FIG. 9A are the to-be-presented documents, other documents excluding those in the first column in FIG. 9B are the to-be-presented documents (that is, documents with shaded parts), and all documents (that is, documents with shaded parts) in FIG. 9C are the to-be-presented documents.

704. Determine visible proportions of shielded regions of the multiple documents according to areas of the multiple documents that are covered when the straight line horizontally moves with the sliding start point or covered when the straight line horizontally moves along the first line segment from the start point of the second click to the end point of the second click.

705. Determine, according to the visible proportions of the shielded regions of the multiple documents, visible proportions of shielded regions of documents, having no intersection point with the straight line, in the to-be-presented documents.

In this embodiment, the user terminal first determines, according to the areas of the multiple documents that are covered when the straight line perpendicular to the multiple documents in the to-be-presented documents in step 702 horizontally moves with the sliding start point or along the first line segment from the start point of the second click to the end point of the second click, the visible proportions of the shielded regions of the multiple documents, and then determines, according to the visible proportions of the shielded regions of the multiple documents, the visible proportions of the shielded regions of the documents, having no intersection point with the straight line, in the to-be-presented documents.

For example, as shown in FIG. 8A, all the documents are the to-be-presented documents in step 702, and in this case, the multiple documents in the to-be-presented documents are documents in the first column in FIG. 8A, and the straight line A is perpendicular to the documents in the first column. If the user moves the sliding start point A to the point B in a horizontal direction, the user terminal determines, according to areas (that is, shaded areas of the documents in the first column) covered on the documents in the first column when the straight line A moves with the sliding start point A, visible proportions of shielded regions of the documents in the first column, if the user successively clicks the point A and the point B, where the point A is the start point of the second click, the point B is the end point of the second click, and a line segment AB is the first line segment, the user terminal, determines, according to areas (that is, shaded areas of the documents in the first column) covered on the documents in the first column when the straight line A horizontally moves along the line segment AB from the point A to the point B. visible proportions of shielded regions of the documents in the first column, where the shaded regions of the documents in the first column are visible regions of the documents in the first column. Because the documents in the second column, in the third column, and in the fourth column have no intersection point with the straight line A, the user terminal determines, according to the visible proportions of the shielded regions of the documents in the first column (the shaded areas of the documents in the first column), visible proportions of shielded regions of the documents in the second column, in the third column, and in the fourth column, where shaded regions of documents in the second column, in the third column, and in the fourth column are visible regions, and areas (visible proportions) of the shaded regions of the documents in the to-be-presented documents are the same.

As shown in FIG. 8B, the documents in the first column are not used as the to-be-presented documents in step 702, and in this case, the documents in the second column, in the third column, and in the fourth column are used as the to-be-presented documents, and the documents in the second column are the multiple documents in the to-be-presented documents. Processes of the determining, by the user terminal, the visible proportions of the shielded regions of the documents in the second column and the determining the visible proportions of the shielded regions of the documents in the third column and in the fourth column are the same as that of the determining the visible proportions of the shielded regions of the to-be-presented documents in FIG. 8A, and details are not described herein.

As shown in FIG. 8C, all the documents are the to-be-presented documents in step 702, and in this case, the documents in the first column are the multiple documents in the to-be-presented documents. Processes of the determining, by the user terminal, the visible proportions of the shielded regions of the documents in the first column and the determining the visible proportions of the shielded regions of the documents in the second column, in the third column and in the fourth column are the same as that of the determining the visible proportions of the shielded regions of the to-be-presented documents in FIG. 8A, and details are not described herein.

It can be seen from the foregoing description that, the areas of the visible regions (areas of the shaded regions) of the to-be-presented documents in FIGS. 8A-C are equal to the areas of multiple documents that are covered when the straight line A moves.

706. Determine visible proportions of shielded regions of the multiple documents according to areas of the multiple documents that are covered when the straight line vertically moves with the sliding start point or covered when the straight line vertically moves along the first line segment from the start point of the second click to the end point of the second click.

707. Determine, according to the visible proportions of the shielded regions of the multiple documents, visible proportions of shielded regions of documents, having no intersection point with the straight line, in the to-be-presented documents.

In this embodiment, the user terminal first determines, according to areas of the multiple documents that are covered when the straight line perpendicular to the multiple documents in the to-be-presented documents in step 702 vertically moves with the sliding start point or along the first line segment from the start point of the second click to the end point of the second click, the visible proportions of the shielded regions of the multiple documents, and then determines, according to the visible proportions of the shielded regions of the multiple documents, the visible proportions of the shielded regions of the documents, having no intersection point with the straight line, in the to-be-presented documents.

For example, as shown in FIG. 9A, all the documents are the to-be-presented documents in step 702, and in this case, the multiple documents in the to-be-presented documents are the documents in the first column in FIG. 9A, and the straight line A is perpendicular to the documents in the first column. If the user moves the sliding start point A to the point B in a vertical direction, the user terminal determines, according to areas (that is, shaded areas of the documents in the first column) covered on the documents in the first column when the straight line B moves with the sliding start point A, visible proportions of shielded regions of the documents in the first column, if the user successively clicks the point A and the point B, where the point A is the start point of the second click, the point B is the end point of the second click, and the line segment AB is the first line segment, the user terminal determines, according to areas (that is, shaded areas of the documents in the first column) covered on the documents in the first column when the straight line A vertically moves along the line segment AB from the point A to the point B, where the shaded areas of the documents in the first column are visible regions of the documents in the first column. Because the documents in the second column and in the third column have no intersection point with the straight line B, the user terminal determines, according to the visible proportions of the shielded regions of the documents in the first column (the shaded areas of the documents in the first column), visible proportions of shielded regions of the documents in the second column and in the third column, where shaded regions of documents in the second column and in the third column are visible regions, and areas (visible proportions) of the shaded regions of documents in the to-be-presented documents are the same.

As shown in FIG. 9B, the documents in the first column are not used as the to-be-presented documents in step 702, and in this case, the documents in the second column and in the third column are used as the to-be-presented documents, and the documents in the second column are the multiple documents in the to-be-presented documents. Processes of the determining, by the user terminal, the visible proportions of the shielded regions of the documents in the second column and the determining the visible proportions of the shielded regions of the documents in the third column are the same as that of the determining the visible proportions of the shielded regions of the to-be-presented documents in FIG. 9A, and details are not described herein.

As shown in FIG. 9C, all the documents are the to-be-presented documents in step 702, and in this case, the documents in the first column are the multiple documents in the to-be-presented documents. Processes of the determining, by the user terminal, the visible proportions of the shielded regions of the documents in the first column and the determining the visible proportions of the shielded regions of the documents in the second column and in the third column are the same as that of the determining the visible proportions of the shielded regions of the to-be-presented documents in FIG. 9A, and details are not described herein.

It can be seen from the foregoing description that, the areas of the visible regions (areas of the shaded regions) of the to-be-presented documents in FIGS. 9A-C are equal to the areas of multiple documents that are covered when the straight line B moves.

708. Select all documents on a screen as the to-be-presented documents.

709. Proportionally adjust the visible proportions of the shielded regions of the to-be-presented documents according to a position, a length, and a direction of a sliding track on which the sliding start point is located or a position, a length, and a direction of the first line segment on the screen.

Figure 10:
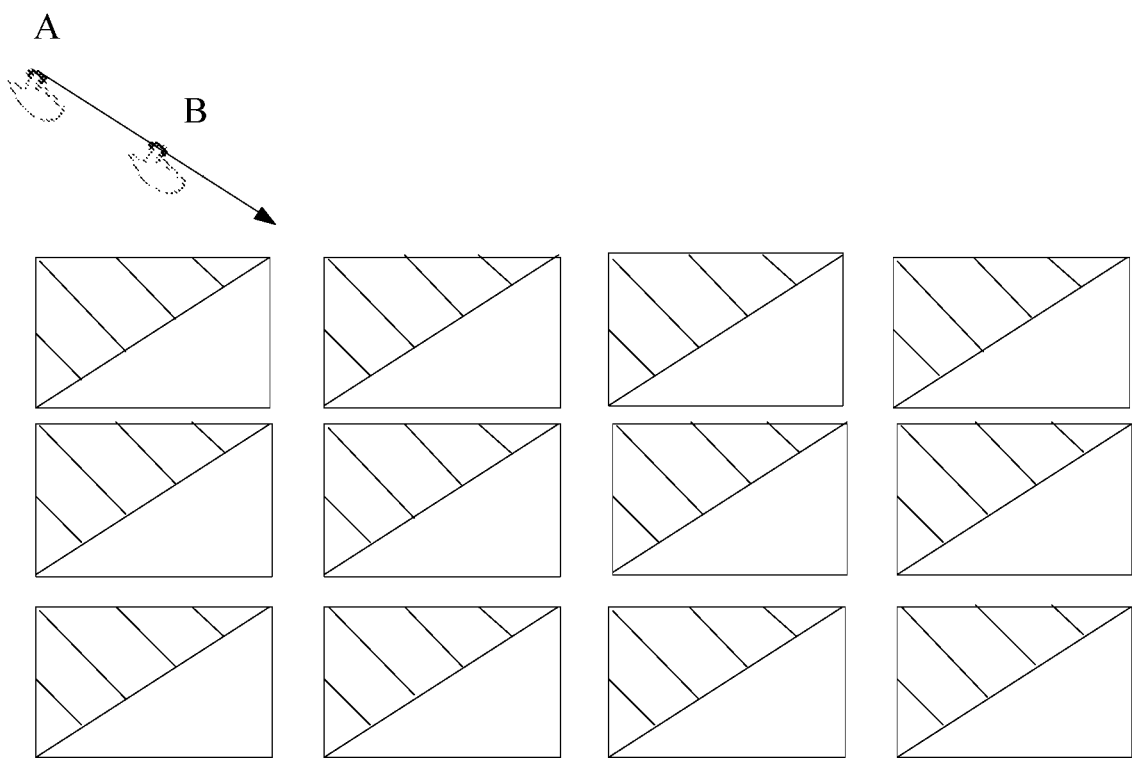
FIG. 10 is a schematic diagram illustrating that shielded regions are adjusted when a selected input is neither in a horizontal direction nor in a vertical direction according to an embodiment of the present disclosure.

In this embodiment, when the user moves the sliding start point neither in the horizontal direction nor in the vertical direction or the first line segment goes neither in the horizontal direction nor in the vertical direction, all the documents on the screen are selected as the to-be-presented documents, where the sliding start point or the start point of the second click is located in any of four corners of the screen of the user terminal. In actual application, using a sliding track as an example, shielded regions of to-be-presented documents are adjusted when the sliding start point moves neither in a horizontal direction nor in a vertical direction, as shown in FIG. 10. The sliding start point A is located in the upper left corner of the screen of the user terminal, and in this case, all documents in FIG. 10 are the to-be-presented documents. When the user moves the sliding start point A to a point B at an angle to the horizontal direction or the vertical direction, the user terminal proportionally adjusts the visible proportions of the shielded regions of the to-be-presented documents according to the position, the length, and the direction of the sliding track that is from the point A to the point B. Using a click as an example, the point A is the start point of the second click and the point B is the end point of the second click, in this case, an angle is formed between a line segment AB and the horizontal direction or the vertical direction, where the line segment AB is formed between the point A and the point B, and the user terminal proportionally adjusts the visible proportions of the shielded regions of the to-be-presented documents according to the position, the length, and the direction of the line segment AB on the screen.

It should be noted that, a shaded region of each document in the to-be-presented documents is a visible region. Herein, the proportionally adjusting, by the user terminal, the visible proportions of the shielded regions of the to-be-presented documents according to the position, the length, and the direction of the sliding track or the position, the length, and the direction of the first line segment on the screen belongs to the prior art, and is not described herein.

It should be noted that, the documents in FIG. 10 are the same in shape and display dimension.

For ease of description, shapes of the documents in FIG. 8, FIG. 9, and FIG. 10 are all described using a rectangle, in actual application, a person skilled in the art may adjust the shapes and display dimensions of the documents according to the size of the screen of the user terminal.

In this embodiment, if a user moves a sliding start point in a horizontal direction or in a vertical direction, or if a first line segment goes in a horizontal direction or in a vertical direction, documents at a side of a moving direction of the sliding start point are selected as to-be-presented documents using a straight line that passes through the sliding start point and that is perpendicular to multiple documents in the to-be-presented documents as a reference, or if a first line segment goes in a horizontal direction or in a vertical direction, documents at a side of a direction from a start point of a second click to an end point of the second click are selected as to-be-presented documents using a straight line that passes through the start point of the second click and that is perpendicular to multiple documents in the to-be-presented documents as a reference. Visible proportions of shielded regions of the multiple documents are determined according to areas of the multiple documents that are covered when the straight line horizontally or vertically moves with the sliding start point or covered when the straight line horizontally or vertically moves along the first line segment from the start point of the second click to the end point of the second click, and visible proportions of shielded regions of documents, having no intersection point with the straight line, in the to-be-presented documents are determined according to the visible proportions of the shielded regions of the multiple documents. If the sliding start point moves neither in the horizontal direction nor in the vertical direction, or if the first line segment goes neither in the horizontal direction nor in the vertical direction, all documents on a screen are selected as the to-be-presented documents, and the visible proportions of the shielded regions of the to-be-presented documents are proportionally adjusted according to a position, a length, and a direction of a sliding track on which the sliding start point is located or a position, a length, and a direction of the first line segment on the screen. In this way, when the user and a person with whom documents are shared watch a same computer screen together, and there are multiple documents that need to be shared, a user terminal can adjust, in batches according to different gestures of the user, visible proportions of shielded regions of the documents that need to be shared such that the user terminal presents merely documents that need to be shared and the user terminal can correspondingly present, according to a selected input (clicking or sliding) of the user, partial regions of the multiple documents, thereby avoiding excessive exposure of information when shared documents are browsed.

Figure 11:
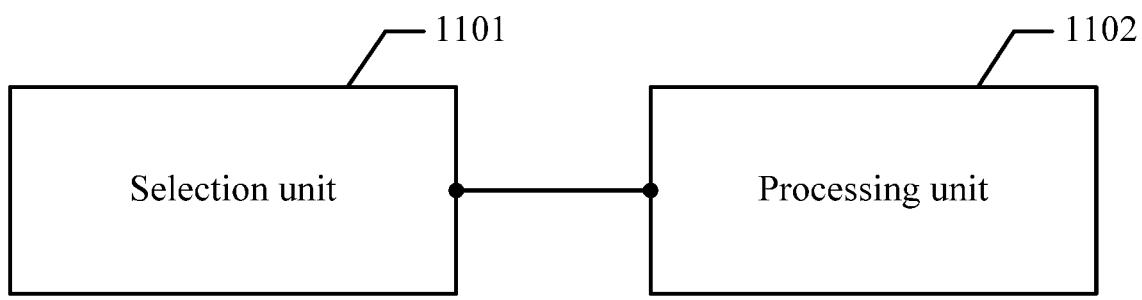
FIG. 11 is a structural reference diagram of an embodiment of a user terminal according to an embodiment of the present disclosure.

A user terminal for executing the foregoing document presentation method according to an embodiment of the present disclosure is described in the following. A basic logical structure of the user terminal is shown in FIG. 11, and an embodiment of the user terminal in this embodiment of the present disclosure includes a selection unit 1101 and a processing unit 1102.

The selection unit 1101 is configured to select, from all documents on a screen according to a first click position of a user, a to-be-presented document that presents content, where all the documents on the screen are shielded and invisible to the user.

The processing unit 1102 is configured to identify a selected input of the user, and adjust a visible proportion of a shielded region of the to-be-presented document according to the identified selected input.

In this embodiment, the selection unit 1101 selects, from all documents on a screen according to a first click position of a user, a to-be-presented document that presents content, where all the documents on the screen are shielded and invisible to the user, and a processing unit 1102 identifies a sliding track of the user on the screen, and adjusts a visible proportion of a shielded region of the to-be-presented document according to a position, a length, and a direction of the identified sliding track. In this way, when the user and a person with whom documents are shared watch a same computer screen together, a user terminal presents merely a document that needs to be shared, and the user terminal can correspondingly present a partial region of the to-be-presented document according to a selected input of the user, thereby avoiding excessive exposure of information when a shared document is browsed.

Figure 12:
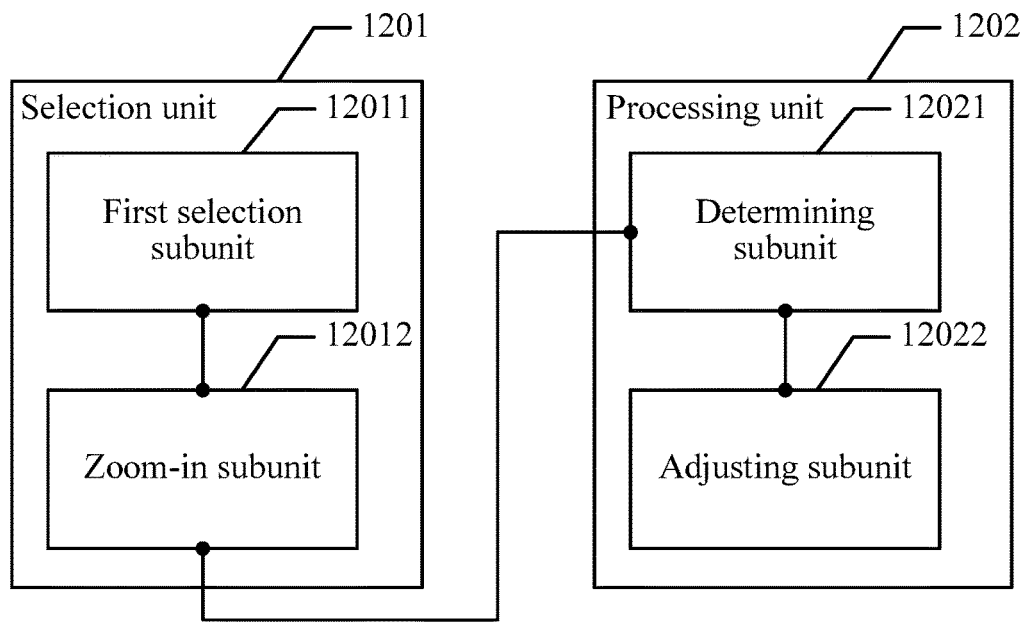
FIG. 12 is a structural reference diagram of another embodiment of a user terminal according to an embodiment of the present disclosure.

To better understand the foregoing embodiment, when there is one to-be-presented document, a data exchange manner of a user terminal is described in the following by means of interaction between modules and units that are included in the user terminal. Referring to FIG. 12, another embodiment of the user terminal in this embodiment of the present disclosure includes a selection unit 1201 and a processing unit 1202, where the selection unit 1201 includes a first selection subunit 12011 and a zoom-in subunit 12012, and the processing unit 1202 includes a determining subunit 12021 and an adjusting unit 12022.

The first selection subunit 12011 selects a clicked document as a to-be-presented document according to a first click position, where all documents on a screen are shielded and invisible to a user and all the documents on the screen are the same in shape and display dimension, and then sends the selected to-be-presented document to the zoom-in subunit 12012. In actual application, content of the documents is not limited, which may be text content, pictures, or image content, a manner for shielding the documents by the user is not limited, and the user may shield the documents on the screen by clicking a specified physical button or virtual button on the user terminal with a finger or may shield the documents on the screen by a specified gesture, and then all the documents on the screen are shielded according to an instruction of the user and are invisible to the user. Optionally, the user may shield, in a tap mode as required, a document that needs the user to shield (for example, clicking and holding down the document).

The zoom-in subunit 12012 zooms in the to-be-presented document, and then sends the to-be-presented document that is after being zoomed in to the determining subunit 12021. In actual application, a zoom-in ratio of the to-be-presented document is not limited, and a fixed zoom-in ratio may be set by the user according to the size of the screen of the user terminal. Certainly, the user may also zoom in the to-be-presented document according to preference of the user by a gesture or a mouse.

If an identified selected input is a non-closed sliding track or a second line segment formed between start and end points of a second click, the determining subunit 12021 determines that a sliding start point or a start point of the second click is located on a boundary of the to-be-presented document and an end point to which the sliding start point moves or an end point of the second click is located on the to-be-presented document or on the boundary of the to-be-presented document, and then sends a result of the determining to the adjusting subunit 12022. In actual application, refer to FIGS. 4A-B, refer to the method embodiment for the description about FIG. 4, and details are not described herein.

If an identified sliding track is the non-closed sliding track or the second line segment formed between the start and end points of the second click, the adjusting subunit 12022 may adjust a visible proportion of a shielded region of the to-be-presented document according to a position, a length, and a direction of the identified sliding track or a position, a length, and a direction of the second line segment on the screen. In actual application, the user terminal can calculate the visible proportion according to the position, the length, and the direction of the sliding track, and then adjust the visible proportion of the shielded region of the to-be-presented document. The calculating, by the user terminal, the visible proportion according to the position, the length, and the direction of the sliding track or the position, the length, and the direction of the second line segment on the screen belongs to the prior art, and is not described in detail herein.

If an identified sliding track is a closed sliding track, the adjusting subunit 12022 may further adjust a visible proportion of a shielded region of the to-be-presented document according to an area of a closed pattern formed by the sliding track on the to-be-presented document. In actual application, the user terminal may identify the sliding track using a sensor, where the sliding track may be a circle, a rectangle, a triangle, or another closed pattern, which is not limited herein, the closed pattern formed by the sliding track is a visible region in the shielded region of the to-be-presented document.

In this embodiment, a first selection subunit 12011 selects a clicked document as a to-be-presented document according to a first click position, where all documents on a screen are shielded and invisible to a user and all the documents on the screen are the same in shape and display dimension, a determining subunit 12021 determines, if an identified sliding track is a non-closed sliding track or a second line segment formed between start and end points of a second click, that a sliding start point or a start point of the second click is located on a boundary of the to-be-presented document and an end point to which the sliding start point moves or an end point of the second click is located on the to-be-presented document or on the boundary of the to-be-presented document, and then an adjusting subunit 12022 adjusts, in both cases in which the sliding track is the non-closed sliding track or the second line segment formed between the start and end points of the second click, and the sliding track is a closed sliding track, a visible proportion of a shielded region of the to-be-presented document. In this way, when a user and a person with whom documents are shared watch a same computer screen together, the user terminal presents merely a document that needs to be shared, and the user terminal can correspondingly present a partial region of the document according to the sliding track of the user, thereby avoiding excessive exposure of information when a shared document is browsed.

Figure 13:
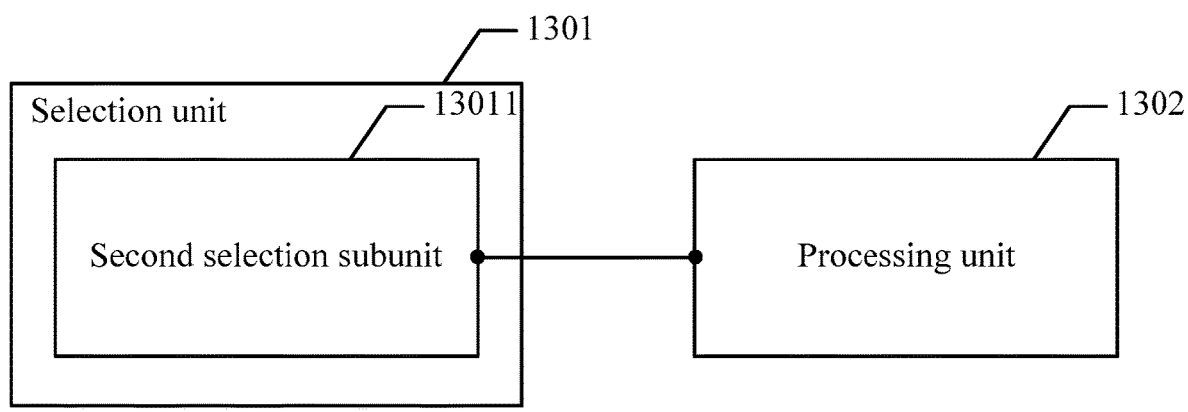
FIG. 13 is a structural reference diagram of another embodiment of a user terminal according to an embodiment of the present disclosure.

Referring to FIG. 13, the following describes a case in which there are multiple to-be-presented documents, and another embodiment of a user terminal in this embodiment of the present disclosure includes a selection unit 1301 and a processing unit 1302.

The selection unit 1301 includes a second selection subunit 13011.

The second selection subunit is configured to select a preset quantity of to-be-presented documents according to a position of a start point of a selected input, where the start point of the selected input is a sliding start point or a start point of a second click.

The processing unit is configured to identify a sliding track of a user or a first line segment formed between start and end points of the second click, and adjust visible proportions of shielded regions of the to-be-presented documents according to a position, a length, and a direction of the sliding track or first line segment on the screen.

The start and end points of the second click include the start point of the second click and an end point of the second click.

In this embodiment, a user terminal adjusts visible proportions of shielded regions of to-be-presented documents using a second selection subunit 13011 and a processing unit 1302. In this way, when a user and a person with whom documents are shared watch a same computer screen together, the user terminal presents merely documents that need to be shared, and the user terminal can correspondingly present partial regions of the to-be-presented documents according to a selected input of the user, thereby avoiding excessive exposure of information when shared documents are browsed.

Figure 14:
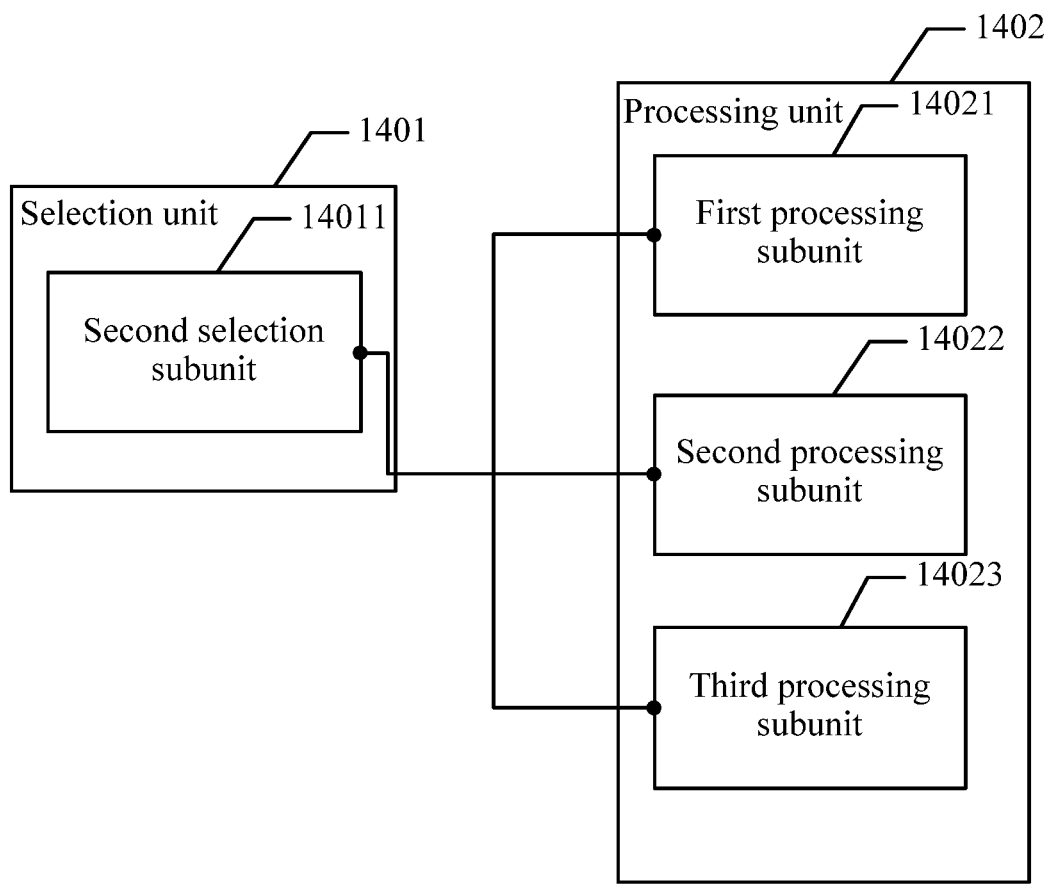
FIG. 14 is a structural reference diagram of another embodiment of a user terminal according to an embodiment of the present disclosure.

To better understand the foregoing embodiment, when there are multiple to-be-presented documents, a data exchange manner of a user terminal is described in the following by means of interaction between modules and units that are included in the user terminal. Referring to FIG. 14, another embodiment of the user terminal in this embodiment of the present disclosure includes a selection unit 1401 and a processing unit 1402, where the selection unit 1401 includes a second selection subunit 14011, and the processing unit 1402 includes a first processing subunit 14021, a second processing subunit 14022, and a third processing subunit 14023.

The second selection subunit 14011 may select a preset quantity of to-be-presented documents according to a position of a start point of a selected input, where all documents on a screen are shielded and invisible to a user and all the documents on the screen are the same in shape and display dimension, and then send the selected to-be-presented documents to the first processing subunit 14021, the second processing subunit 14022, or the third processing subunit 14023. In actual application, a quantity of the corresponding to-be-presented documents varies with a position of a sliding start point on the screen. In actual application, content of the documents is not limited, which may be text content, pictures, or image content, a manner for shielding the documents by the user is not limited, and the user may shield the documents on the screen by clicking a specified physical button or virtual button on the user terminal with a finger or may shield the documents on the screen by a specified gesture, and then all the documents on the screen are shielded according to an instruction of the user and are invisible to the user. Optionally, the user may shield, in a tap mode as required, a document that needs the user to shield (for example, clicking and holding down the document).

If the user moves the sliding start point in a horizontal direction or a first line segment goes in a horizontal direction, the first processing subunit 14021 adjusts, in a horizontally progressive presentation manner, visible proportions of shielded regions of the to-be-presented documents selected by the second selection subunit 14011.

If the user moves the sliding start point in a vertical direction or a first line segment goes in a vertical direction, the second processing subunit 14022 adjusts, in a vertically progressive presentation manner, visible proportions of shielded regions of the to-be-presented documents selected by the second selection subunit 14011.

If the sliding start point moves neither in the horizontal direction nor in the vertical direction, or if the first line segment goes neither in the horizontal direction nor in the vertical direction, the third processing subunit 14023 proportionally adjusts, according to a position, a length, and a direction of a sliding track on which the sliding start point is located or a position, a length, and a direction of the first line segment on the screen, the visible proportions of the shielded regions of the to-be-presented documents selected by the second selection subunit 14011. In actual application, the proportionally adjusting the visible proportions of the shielded regions of the to-be-presented documents according to a position, a length, and a direction of a sliding track on which the sliding start point is located or a position, a length, and a direction of the first line segment on the screen belongs to the prior art, and is not described in detail herein.

In this embodiment, a second selection subunit 14011 may select a preset quantity of to-be-presented documents according to a position of a start point of a selected input, where all documents on a screen are shielded and invisible to a user and all the documents on the screen are the same in shape and display dimension. When a user moves a sliding start point in a horizontal direction or moves a sliding start point in a vertical direction, or a sliding start point moves neither in a horizontal direction nor in a vertical direction, or when a first line segment goes in a horizontal direction or in a vertical direction, or a first line segment goes neither in a horizontal direction nor in a vertical direction, a first processing subunit 14021, a second processing subunit 14022, and a third processing subunit 14023 adjusts visible proportions of shielded regions of to-be-presented documents according to different sliding directions or different directions of the first line segment. In this way, when the user and a person with whom documents are shared watch a same computer screen together, and there are multiple documents that need to be shared, a user terminal can adjust, in batches according to different gestures of the user, visible proportions of shielded regions of the documents that need to be shared such that the user terminal presents merely documents that need to be shared and the user terminal can correspondingly present, according to the selected input of the user, partial regions of the multiple documents, thereby avoiding excessive exposure of information when shared documents are browsed.

When there are multiple to-be-presented documents, a data exchange manner of a user terminal is described in the following by means of interaction between modules and units that are included in the user terminal. Referring to FIG. 14, another embodiment of the user terminal in this embodiment of the present disclosure includes a selection unit 1401 and a processing unit 1402, where the selection unit 1401 includes a second selection subunit 14011, and the processing unit 1402 includes a first processing subunit 14021, a second processing subunit 14022, and a third processing subunit 14023.

If a user moves a sliding start point in a horizontal direction or in a vertical direction, the second selection subunit 14011 selects documents at a side of a moving direction of the sliding start point as to-be-presented documents using a straight line that passes through the sliding start point and that is perpendicular to multiple documents in the to-be-presented documents as a reference, or if a first line segment goes in a horizontal direction or in a vertical direction, the second selection subunit 14011 selects documents at a side of a direction that is from a start point of a second click to an end point of the second click as to-be-presented documents using a straight line that passes through the start point of the second click and that is perpendicular to multiple documents in the to-be-presented documents as a reference.

Then, the second selection subunit 14011 sends the selected to-be-presented documents to the first processing subunit 14021 or the second processing subunit 14022, where all documents on a screen are shielded and invisible to a user and all the documents on the screen are the same in shape and display dimension. In actual application, content of the documents is not limited, which may be text content, pictures, or image content, a manner for shielding the documents by the user is not limited, and the user may shield the documents on the screen by clicking a specified physical button or virtual button on the user terminal with a finger or may shield the documents on the screen by a specified gesture, and then all the documents on the screen are shielded according to an instruction of the user and are invisible to the user.

After the first processing subunit 14021 receives the to-be-presented documents sent by the second selection subunit 14011, the first processing subunit 14021 determines, according to areas of the multiple documents that are covered when the straight line horizontally moves with the sliding start point or covered when the straight line horizontally moves along the first line segment from the start point of the second click to the end point of the second click, visible proportions of shielded regions of multiple documents, and then the first processing subunit 14021 determines visible proportions of shielded regions of documents, having no intersection point with the straight line, in the to-be-presented documents according to the visible proportions of the shielded regions of the multiple documents.

After the second processing subunit 14022 receives the to-be-presented documents sent by the second selection subunit 14011, the second processing subunit 14022 determines, according to areas of the multiple documents that are covered when the straight line vertically moves with the sliding start point or covered when the straight line vertically moves along the first line segment from the start point of the second click to the end point of the second click, visible proportions of shielded regions of multiple documents, and then the second processing subunit 14022 determines visible proportions of shielded regions of documents, having no intersection point with the straight line, in the to-be-presented documents according to the visible proportions of the shielded regions of the multiple documents.

In actual application, FIG. 8 is a schematic diagram illustrating that shielded regions of to-be-presented documents are adjusted when a selected input is in a horizontal direction, and FIG. 9 is a schematic diagram illustrating that shielded regions of to-be-presented documents are adjusted when a selected input is in a vertical direction. Refer to the foregoing method embodiments for specific description, and details are not described herein.

If the sliding start point moves neither in the horizontal direction nor in the vertical direction, or the first line segment goes neither in the horizontal direction nor in the vertical direction, the second selection subunit 14011 selects all the documents on the screen as the to-be-presented documents, where the sliding start point or the start point of the second click is located at any of four corners of the screen of the user terminal, and then sends the selected to-be-presented documents to the third processing subunit 14023.

After receiving the to-be-presented documents sent by the second selection subunit 14011, the third processing subunit 14023 proportionally adjusts visible proportions of shielded regions of the to-be-presented documents according to a position, a length, and a direction of a sliding track on which the sliding start point is located or a position, a length, and a direction of the first line segment on the screen. In actual application, the proportionally adjusting, by the user terminal, visible proportions of shielded regions of the to-be-presented documents according to a position, a length, and a direction of a sliding track on which the sliding start point is located or a position, a length, and a direction of the first line segment on the screen belongs to the prior art, and is not described in detail herein.

In actual application, referring to FIG. 10, FIG. 10 is a schematic diagram illustrating that shielded regions of to-be-presented documents are adjusted when a selected input of a user is neither in a horizontal direction nor in a vertical direction. Refer to the foregoing method embodiments for specific description, and details are not described herein.

In this embodiment, a second selection subunit 14011 selects to-be-presented documents, and then a first processing subunit 14021, a second processing subunit 14022, and a third processing subunit 14023 determine visible proportions 1414 of shielded regions of the to-be-presented documents according to different sliding directions or different directions of a first line segment. In this way, when a user and a person with whom documents are shared watch a same computer screen together, and there are multiple documents that need to be shared, a user terminal can adjust, in batches according to different gestures of the user, visible proportions of shielded regions of the documents that need to be shared such that the user terminal presents merely documents that need to be shared and the user terminal can correspondingly present, according to a selected input of the user, partial regions of the multiple documents, thereby avoiding excessive exposure of information when shared documents are browsed.

Figure 15:
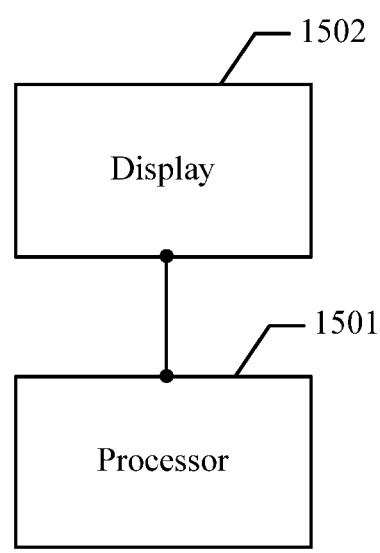
FIG. 15 is a structural reference diagram of an embodiment of a user terminal according to an embodiment of the present disclosure.

Referring to FIG. 15, another embodiment of a user terminal in this embodiment of the present disclosure includes a processor 1501 and a display 1502 for displaying documents.

The processor 1501 is configured to execute the following procedures selecting, from all documents on a screen according to a first click position of a user, a to-be-presented document that presents content, where all the documents on the screen are shielded and invisible to the user, and identifying a selected input of the user, and adjusting a visible proportion of a shielded region of the to-be-presented document according to the identified selected input.

In this embodiment, a processor 1501 adjusts a presented region of a document displayed by a display 1502 such that a user terminal presents merely a document that needs to be shared, and the user terminal can correspondingly present a partial region of the to-be-presented document according to a selected input of a user, thereby avoiding excessive exposure of information when a shared document is browsed.

It may be clearly understood by a person skilled in the art that, for the purpose of convenient and brief description, for detailed working processes of the foregoing system, apparatus, and unit, reference may be made to corresponding processes in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The foregoing embodiments are merely intended for describing the technical solutions of the present disclosure, but not for limiting the present disclosure. Although the present disclosure is described in detail with reference to the foregoing embodiments, a person of ordinary skill in the art should understand that modifications to the technical solutions described in the foregoing embodiments or equivalent replacements to some technical features thereof may still be made, without departing from the spirit and scope of the technical solutions of the embodiments of the present disclosure.

What is claimed is:

1. A document presentation method, comprising:
   displaying a plurality of rectangles representing a plurality of documents on a screen of a user terminal, wherein a shielded region of each of the plurality of documents hides content within each of the plurality of documents;
   enabling a privacy mode of the user terminal after all of the plurality of documents on the screen are shielded according to an instruction of a user of the user terminal;
   receiving a first user input selecting one or more documents of the plurality of documents represented as the plurality of rectangles on the screen, wherein a preset quantity of the plurality of documents is determined according to a position of a start point of the first user input on the screen;
   receiving a second user input indicating a manner by which to adjust a visible portion of the shielded region of the one or more documents in response to receiving the first user input;
   determining a type of the second user input; and
   adjusting the visible portion of the shielded region of the one or more documents according to the type of the second user input, a position of the second user input, and a length of the second user input.

2. The method according to claim 1, wherein each of the plurality of rectangles displayed on the screen has a common display dimension.

3. The method according to claim 1, wherein receiving the first user input that is a click position selecting one document of the plurality of documents comprises zooming in on a rectangle of the plurality of rectangles representing the document of the plurality of documents.

4. The method according to claim 3, wherein the type of the second user input is a sliding track between a start point and an end point, wherein the method further comprises determining that the start point of the second user input is located on the rectangle of the plurality of rectangles representing the one or more documents of the plurality of documents and the end point of the second user input is located within or on the rectangle of the plurality of rectangles representing the one or more documents of the plurality of documents.

5. The method according to claim 3, wherein the type of the second user input is a sliding track between a start point and an end point that forms a closed pattern, and wherein the shielded region of the one or more documents of the plurality of documents is adjusted based on the closed pattern formed by the second user input.

6. The method according to claim 1, wherein the shielded region of the one or more documents of the plurality of documents is adjusted based on a direction of the second user input on the screen.

7. The method according to claim 6, wherein the shielded region of the one or more documents of the plurality of documents is proportionally adjusted based on the length of the second user input.

8. The method according to claim 7, wherein each of the shielded regions of the plurality of documents is adjusted in a first direction based on the second user input moving in the first direction across the screen.

9. The method according to claim 6, wherein the first user input is a sliding start point that determines an invisible straight line by user moving the sliding start point in a horizontal direction or a vertical direction, and displaying a subset of the plurality of rectangles representing a subset of the plurality of documents aligned along the invisible straight line on the screen.

10. A user terminal, comprising:
    a memory comprising instructions; and
    a processor coupled to the terminal and configured to execute the instructions that, when executed, cause the processor to be configured to:
    display a plurality of rectangles representing a plurality of documents on a screen of the user terminal, wherein a shielded region of each of the plurality of documents hides content within each of the plurality of documents;
    enable a privacy mode of the user terminal after all of the plurality of documents on the screen are shielded according to an instruction of a user of the user terminal;
    receive a first user input selecting one or more documents of the plurality of documents represented as a plurality of rectangles on the screen wherein a preset quantity of the plurality of documents is determined according to a position of a start point of the first user input on the screen;
    receive a second user input indicating a manner by which to adjust a visible portion of the shielded region of the one or more documents in response to receiving the first user input;
    determine a type of the second user input; and adjust the visible portion of the shielded region of the one or more documents according to the type of the second user input, a position of the second user input, and a length of the second user input.

11. The user terminal according to claim 10, wherein each of the plurality of rectangles displayed on the screen has a common display dimension.

12. The user terminal according to claim 10, wherein the instructions further cause the processor to be configured to receive the first user input that is a click position and select one document of the plurality of documents and zoom in on a rectangle of the plurality of rectangles representing the one or more documents of the plurality of documents.

13. The user terminal according to claim 12, wherein the type of the second user input is a sliding track between a start point and an end point, wherein the instructions further cause the processor to be configured to determine that the start point of the second user input is located on the rectangle of the plurality of rectangles representing the one or more documents of the plurality of documents and the end point of the second user input is located within or on the rectangle of the plurality of rectangles representing the one or more documents of the plurality of documents.

14. The user terminal according to claim 12, wherein the type of the second user input is a sliding track between a start point and an end point that forms a closed pattern, wherein the shielded region of the one or more documents of the plurality of documents is adjusted based on the closed pattern formed by the second user input.

15. The user terminal according to claim 10, wherein the shielded region of the one or more documents of the plurality of documents is adjusted based on a direction of the second user input on the screen.

16. The user terminal according to claim 15, wherein the shielded region of the one or more documents of the plurality of documents is proportionally adjusted based on the length of the second user input.

17. The user terminal according to claim 15, wherein the first user input is a sliding start point that determines an invisible straight line by user moving the sliding start point in a horizontal direction or a vertical direction, and displaying a subset of the plurality of rectangles representing a subset of the plurality of documents that are aligned along the invisible straight line on the screen.

* * * * *